US011755802B2

(12) United States Patent
Chonnad et al.

(10) Patent No.: US 11,755,802 B2
(45) Date of Patent: Sep. 12, 2023

(54) DETECTING SHARED RESCOURCES AND COUPLING FACTORS

(71) Applicant: Synopsys, Inc., Mountain View, CA (US)

(72) Inventors: Shivakumar Shankar Chonnad, San Jose, CA (US); Radu Horia Iacob, Hillsboro, OR (US); Vladimir Litovtchenko, Ebersberg (DE)

(73) Assignee: Synopsys, Inc., Sunnyvale, CA (US)

( * ) Notice: Subject to any disclaimer, the term of this patent is extended or adjusted under 35 U.S.C. 154(b) by 106 days.

(21) Appl. No.: 17/564,117

(22) Filed: Dec. 28, 2021

(65) Prior Publication Data
US 2022/0207224 A1 Jun. 30, 2022

Related U.S. Application Data

(60) Provisional application No. 63/151,465, filed on Feb. 19, 2021, provisional application No. 63/132,820, filed on Dec. 31, 2020.

(51) Int. Cl.
*G06F 30/3323* (2020.01)
*G06F 30/367* (2020.01)
*G06F 30/398* (2020.01)
*G06F 30/3308* (2020.01)

(52) U.S. Cl.
CPC ...... *G06F 30/3323* (2020.01); *G06F 30/3308* (2020.01); *G06F 30/367* (2020.01); *G06F 30/398* (2020.01)

(58) Field of Classification Search
CPC .. G06F 30/3323; G06F 30/367; G06F 30/398; G06F 30/3308

USPC ............. 716/106, 111, 136; 703/14
See application file for complete search history.

(56) References Cited

U.S. PATENT DOCUMENTS

| 8,365,132 | B2* | 1/2013 | Hsu | G06F 30/33 |
| | | | | 716/109 |
| 8,943,452 | B2* | 1/2015 | Hsu | G06F 30/33 |
| | | | | 716/109 |
| 9,189,578 | B1* | 11/2015 | Giangarra | G06F 30/30 |
| 10,417,372 | B2* | 9/2019 | Hsu | G06F 30/398 |

(Continued)

OTHER PUBLICATIONS

International Search Report Written Opinion PCT/US2021/065414 dated Apr. 14, 2022.

(Continued)

*Primary Examiner* — Phallaka Kik
(74) *Attorney, Agent, or Firm* — Patterson + Sheridan, LLP

(57) ABSTRACT

A method for dependent failure analysis of a circuit design includes obtaining a circuit design comprising a plurality of circuit elements, and generating a first cone of influence and a second cone of influence for the circuit design. The first cone of influence corresponds to a first one or more inputs of the circuit design. The second cone of influence corresponds to a second one or more inputs of the circuit design. The method further includes determining a first shared circuit element of the circuit elements within a first intersection between the first cone of influence and the second cone of influence. Further, the method includes determining a first coupling factor based on the first intersection between the first cone of influence and the second cone of influence, and outputting the first shared circuit element and the first coupling factor to a memory.

20 Claims, 15 Drawing Sheets

(56) References Cited

U.S. PATENT DOCUMENTS

| | | | | |
|---|---|---|---|---|
| 10,769,336 B1* | 9/2020 | Zhang | ................. | G06F 30/38 |
| 2014/0013293 A1* | 1/2014 | Hsu | .................. | G06F 30/33 |
| | | | | 716/133 |
| 2021/0209277 A1* | 7/2021 | Joseph | ............... | G06F 30/327 |

OTHER PUBLICATIONS

Young Alison et al: "Qualifying Dependent Failure Analysis Within IS026262", Systems, Software and Services Process Improvement, vol. 896, Sep. 5, 2018 (Sep. 5, 2018), pp. 1-10.

Bello Lucia Lo et al: "Recent Advances and Trends in On-Board Embedded and Networked Automotive Systems", IEEE Transactions on Industrial Informatics, IEEE Service Center, New York, NY, US, vol. 15, No. 2, Feb. 1, 2019, pp. 1038-1051.

\* cited by examiner

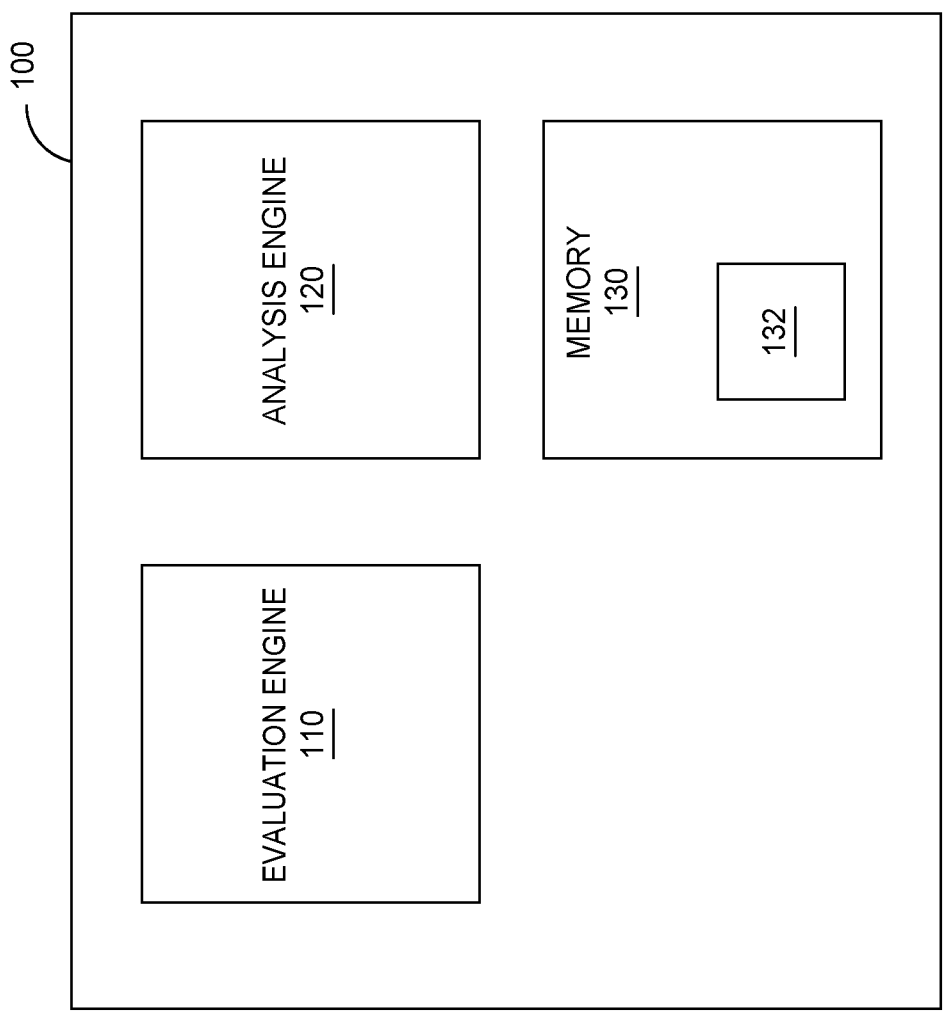

DETECTING SHARED RESCOURCES AND COUPLING FACTORS

RELATED APPLICATION

This application claims the benefit of U.S. provisional patent application Ser. No. 63/132,820, filed Dec. 31, 2020 and U.S. provisional patent application Ser. No. 63/151,465, filed Feb. 19, 2021, which is hereby incorporated herein by reference.

TECHNICAL FIELD

The present disclosure relates to dependent failure analysis for circuit designs, and, more specifically, detecting shared resources and coupling factors within circuit designs for dependent failure analysis.

BACKGROUND

Dependent failures and corresponding coupling factors are used in performing the dependent failure analysis (DFA) of a circuit design. Information regarding the coupling factors involved in dependent failures is used in performing the DFA of a safety related element or elements (e.g., safety circuitries) of a circuit design. Typically, the dependent failures and corresponding coupling factors are through the use of qualitative engineering analysis. In performing qualitative engineering analysis, faulty ports of various dependent failure initiators are identified within a circuit design by manually traversing and analyzing the architecture and hierarchies of the circuit design.

SUMMARY

In one example, a method includes obtaining a circuit design comprising a plurality of circuit elements, and generating a first cone of influence and a second cone of influence for the circuit design. The first cone of influence corresponds to a first one or more inputs of the circuit design. The second cone of influence corresponds to a second one or more inputs of the circuit design. The method further includes determining a first shared circuit element of the circuit elements within a first intersection between the first cone of influence and the second cone of influence, and determining a first coupling factor based on the first intersection between the first cone of influence and the second cone of influence. Further, the method includes outputting the first shared circuit element and the first coupling factor to a memory.

In one example, a system includes a memory storing instructions, and a processor, coupled with the memory to execute the instructions. The instructions when executed cause the processor to obtain a circuit design comprising a plurality of circuit elements, and generate a first cone of influence and a second cone of influence for the circuit design. The first cone of influence corresponds to a first one or more inputs of the circuit design, and the second cone of influence corresponds to a second one or more inputs of the circuit design. Further, the instructions when executed cause the processor to determine a first shared circuit element of the circuit elements within a first intersection between the first cone of influence and the second cone of influence. The instructions when executed further cause the processor to determine a first coupling factor within the first intersection between the first cone of influence and the second cone of influence, and outputting the first shared circuit element and the first coupling factor to the memory.

In one example, a non-transitory computer readable medium including stored instructions, which when executed by a processor, cause the processor to generate a first cone of influence and a second cone of influence from a circuit design. The first cone of influence originating from a first one or more inputs of the circuit design and propagating to a first one or more outputs of the circuit design. The second cone of influence originating from a second one or more inputs of the circuit design and propagating to a second one or more outputs of the circuit design. Further, the processor is caused to determine a first intersecting cone between the first cone of influence and the second cone of influence. The processor is further caused to determine a first shared circuit element of the circuit design based on the first intersecting cone, and output the first shared circuit element to the memory.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a block diagram of a circuit evaluation system, according to one or more examples.

DETAILED DESCRIPTION

Figure 2A:
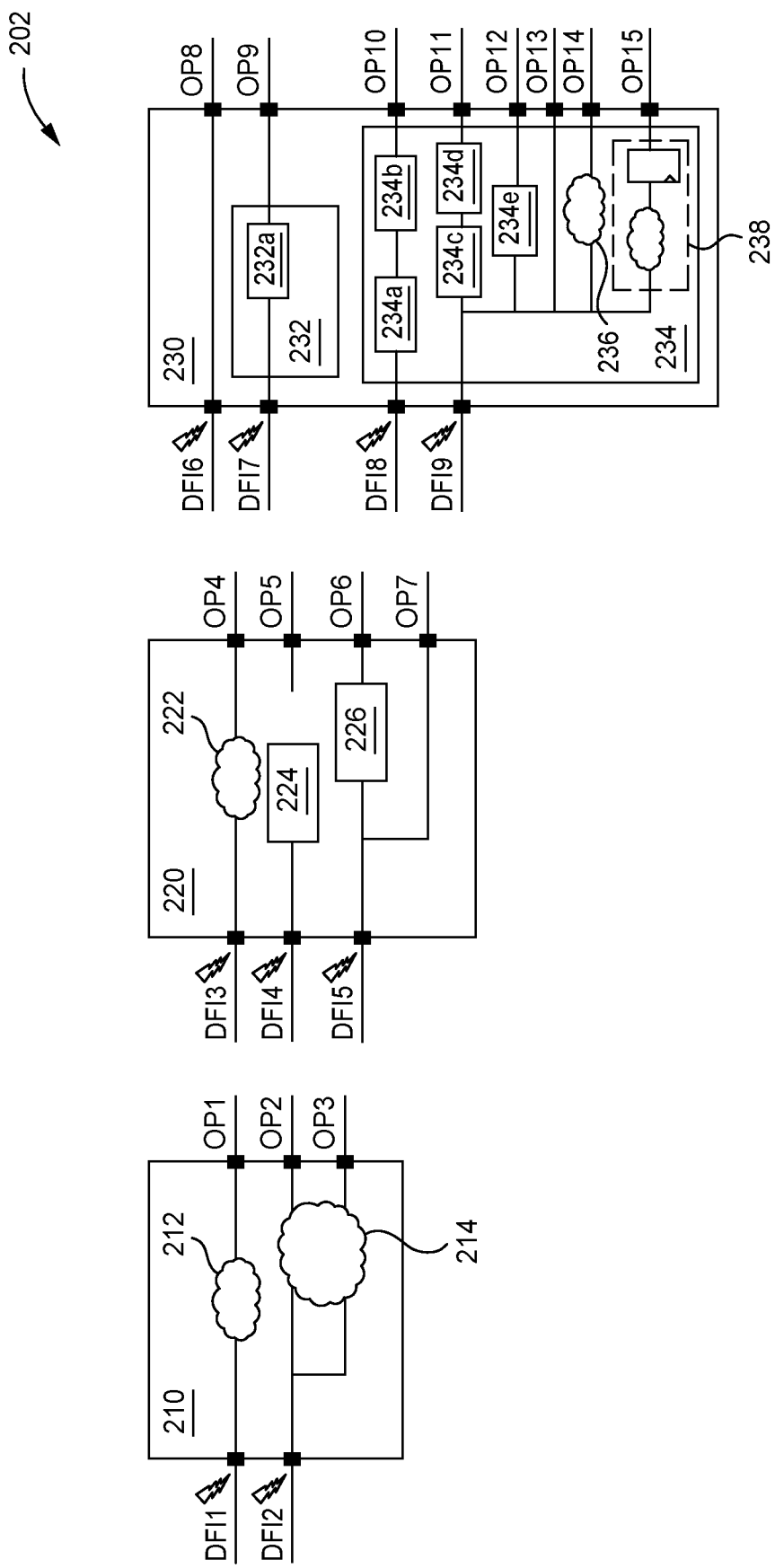
FIG. 2A illustrates example dependent failure initiators, according to one or more examples.

Aspects of the present disclosure relate to detecting shared resources and coupling factors.

During a circuit design evaluation process, the circuit design is evaluated for safety related issues. For example, during an evaluation process, a circuit design is evaluated to determine dependent failures and corresponding coupling factors. A coupling factor, as defined by International Organization for Standardization (ISO) 26262 rev. 2018-12, is a common characteristic or relationship of elements that leads to a dependence in their failures. Coupling factors may include shared resources (e.g., shared signal and/or shared circuit blocks, among others), electromagnetic coupling, and thermal coupling, among others. A shared resource is a circuit element that is included within multiple cones of influence. In one example, a shared resource is a shared input, a shared circuit block, a shared output, a shared module, and a shared signal path, among others. In one or more examples, a coupling factor does not lead to dependent failures unless there is a fault (e.g., an electromagnetic interference, among others) that causes the coupling factor to act as a propagation means for dependent failures. In one or more examples, the coupling factors propagate a dependent failure based on an anomaly within the corresponding circuit design.

The dependent failures and corresponding coupling factors are used in a DFA of the circuit design. Typically, the dependent failures and corresponding coupling factors are manually determined. Manually determining the dependent failures and corresponding factors is a subjective process, and can provide potentially incomplete calculations. Further, manually determining the dependent failures and corresponding coupling factors is error prone and time intensive. As the understanding of the DFA is subjective, the severity (weightage) value of corresponding dependent failure initiators (DFIs) and corresponding coupling factors are also subjective and potentially error-prone. A DFI, as defined by ISO 26262 rev. 2018-12, is a single root cause that leads multiple elements to fail through coupling factors.

In a circuit design, inputs affected by external DFIs will be considered sources of dependent failures (SDFs). Alternatively, internal DFIs may be considered sources of dependent failures (SDFs) as well. Typical DFA processes are unable to quantify the coupling effects of a circuit design and are unable to quantify the severity (weightage) value of the SDFs.

The following disclosure describes a system and method for quantitative DFA of a circuit design. For example, a circuit design is analyzed to identify shared resources that are affected by an SDF and corresponding metrics. For example, the metric may include a severity (weightage) value of the SDF. The identified shared resources and metrics may be used to identify outputs of the circuit design affected by an SDF. Further, the identified shared resources and metrics may be used for the analysis of dependent failures transcending across circuit blocks with the circuit design. In one or more examples, the identified shared resources and metrics may be used to modify the circuit design to improve the fault detection ability of the circuit design.

The system and method disclosed herein for performing quantitative DFA of a circuit design is able to determine dependent failures and corresponding coupling factors more accurately and in less time as compared to other methods. It improves the detection ability of dependent failures through structure analysis by a computing resource (e.g., the circuit evaluation system 100 of FIG. 1) in less time (e.g., one tenth of the time) than it takes other methods to complete the analysis. Accordingly, computer resources may be freed up for other circuit design tasks. The determined dependent failures and coupling factors are used to mitigate the effects of dependent failures within the circuit design, improving a robustness of the circuit design. Accordingly, the circuit design may be used in a larger number of instances, as the circuit design is able to meet more stringent operating standards.

FIG. 1 illustrates a circuit evaluation system 100, according to one or more examples. The circuit evaluation system 100 may be an electronic design automation (EDA) system, or other circuit evaluation systems, circuit evaluation system, or circuit design system. The circuit evaluation system 100 is used during the design and/or verification of a circuit design. The circuit evaluation system 100 includes one or more processors (e.g., the processing device 1402 of FIG. 14) that execute instructions (e.g., the instructions 1426 of FIG. 14) stored in a memory (e.g., the main memory 1404 and/or the machine-readable medium 1424 of FIG. 14) to analyze a circuit design, identify SDFs and shared resources. In one or more examples, the circuit evaluation system 100 receives a circuit design, performs a safety analysis on the circuit design to identify the SDFs, identifies shared resources and physical coupling factors of the circuit design, and determines a contribution of the shared resources on the results of the safety analysis to determine the fault detection ability of the circuit design.

In one or more examples, the circuit evaluation system 100 executes a signal processing function subject to dependent failures enabled by sources of dependent failures and by coupling factors. In one or more examples, the circuit evaluation system 100 overcomes the shortcomings of other approaches in accomplishing identification of sources of dependent failures that are causing dependent failures to occur, identification of coupling factors, and modeling their mechanism to enable dependent failures to occur. Further, the circuit evaluation system 100 determines a severity (weightage) value of the dependent failures within the analyzed blocks and uses the severity (weightage) values to calculate functional safety fault parameters (e.g., a single point fault metric (SPFM), latent fault metric (LFM), and probabilistic metric for hardware failure (PMHF)).

As will be described in more detail in the following, the circuit evaluation system 100 uses circuit elements of a cone of influence (e.g., cone) to determine how much a failure (e.g., faults) of a cone are impacted by SDFs via relevant coupling mechanisms (e.g., factors). The failures may be transient errors that occur within register elements (e.g., flip-flops) of the corresponding circuitry of the cone.

In one or more examples, the circuit evaluation system 100 determines the SDFs, shared resources, and other coupling factors in a common cause failure (multiple outputs impacted by a specific input), in a cascading failure (failure propagating in a chain from input to output), or a combination of both, by determining (e.g., carving) a cone through forward path propagation starting from an SDF. Further, the circuit evaluation system 100 evaluates the cell area of the cone of an SDF, evaluates the severity (weightage) value of an SDF in comparison to other SDFs based on the area of an influenced by the cone, and evaluates sources of intersecting paths between SDF cones to identify coupling factors. The cell area corresponds to the logic gates and/or transistors within the circuit design.

The circuit evaluation system 100 determines the effects of an SDF and corresponding coupling factors. Such information may be used to determine which outputs are impacted by an input that has a failure. In one example, an integrator (e.g., a system-on-chip (SoC) integrator or other integrator) uses the coupling factors to determine how the cascading or common cause failures propagate downstream to other elements in the corresponding system. The circuit evaluation system 100 performs a quantitative approach to determine the severity (weightage) value of the SDFs based on design architecture and implementation, and analysis of cones of influence for relevant SDFs. Accordingly, a more accurate estimation of the fault parameters during a safety analysis may be determined. Understanding quantitative data underlying a safety analysis may be useful during an impact analysis to determine the extent of impact when input is affected or is functionality changed. In one or more examples, an impact analysis is performed during change management based on one or more standards (e.g., ISO 26262). Further, information related to the cones (e.g., area and severity (weightage) value, among others) and the coupling factors may be output as a report (e.g., via the video display unit 1410 of FIG. 14) to be used during safety assessments during the design of a correspond system that incorporates the circuit under evaluation.

The circuit evaluation system 100 of FIG. 1 includes an evaluation engine 110, an analysis engine 120, and a memory 130. The evaluation engine 110 includes one or more processors (e.g., the processing device 1402 of FIG. 14) that execute instructions (e.g., the instructions 1426 of FIG. 14) stored in a memory (e.g., the memory 130, the main memory 1404 of FIG. 14, and/or the machine-readable medium 1424 of FIG. 14). The evaluation engine 110 obtains circuit design 132 from the memory 130. In another example, the evaluation engine 110 receives the circuit design 132 from another system (e.g., a system external to or part of the circuit evaluation system 100) and connected to the circuit evaluation system 100. The circuit design 132 may be received from the external system and stored within the memory 130. In another example, the circuit design 132 is received by the evaluation engine 110 directly, and the circuit design 132 is not stored in the memory 130. The circuit design 132 includes multiple circuit elements. For example, the circuit design 132 includes clock signals, power signals, input pins, output pins, circuit blocks, and modules (e.g., memory modules), among others. The evaluation engine 110 performs a safety analysis on the circuit design 132 to identify SDFs, and determines a cone of influence for each SDF of the circuit design. The evaluation engine 110 further identifies shared resources of the circuit design from intersecting cones of influence and the corresponding coupling factors.

Figure 14:
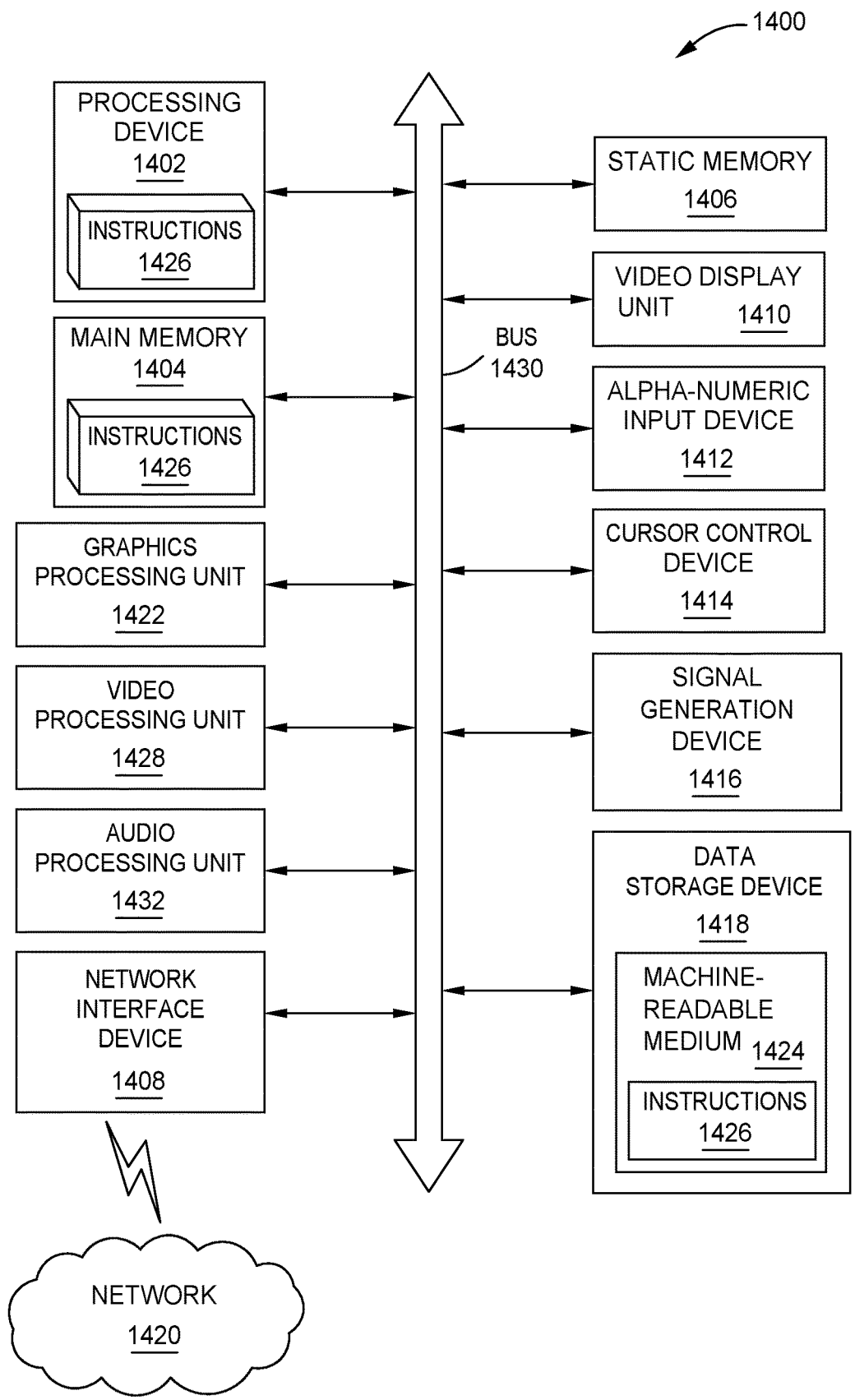
FIG. 14 depicts a diagram of an example computer system in which embodiments of the present disclosure may operate.

The analysis engine 120 includes one or more processors (e.g., the processing device 1402 of FIG. 14) that execute instructions (e.g., the instructions 1426 of FIG. 14) stored in a memory (e.g., the memory 130, the main memory 1404 of FIG. 14, and/or the machine-readable medium 1424 of FIG. 14). The analysis engine 120 evaluates the cell areas of intersections between the cones and the contribution of the intersections on the corresponding safety analysis on the circuit design 132, and evaluates a combination of Boolean operations between the cones of influence and the corresponding contributions on the safety analysis of the circuit design 132.

The memory 130 is configured similar to that of the main memory 1404 of FIG. 14 and/or the machine-readable medium 1424 of FIG. 14. The memory 130 is accessible by the evaluation engine 110 and the analysis engine 120. Further, the memory 130 stores the circuit design 132.

Figure 2B:
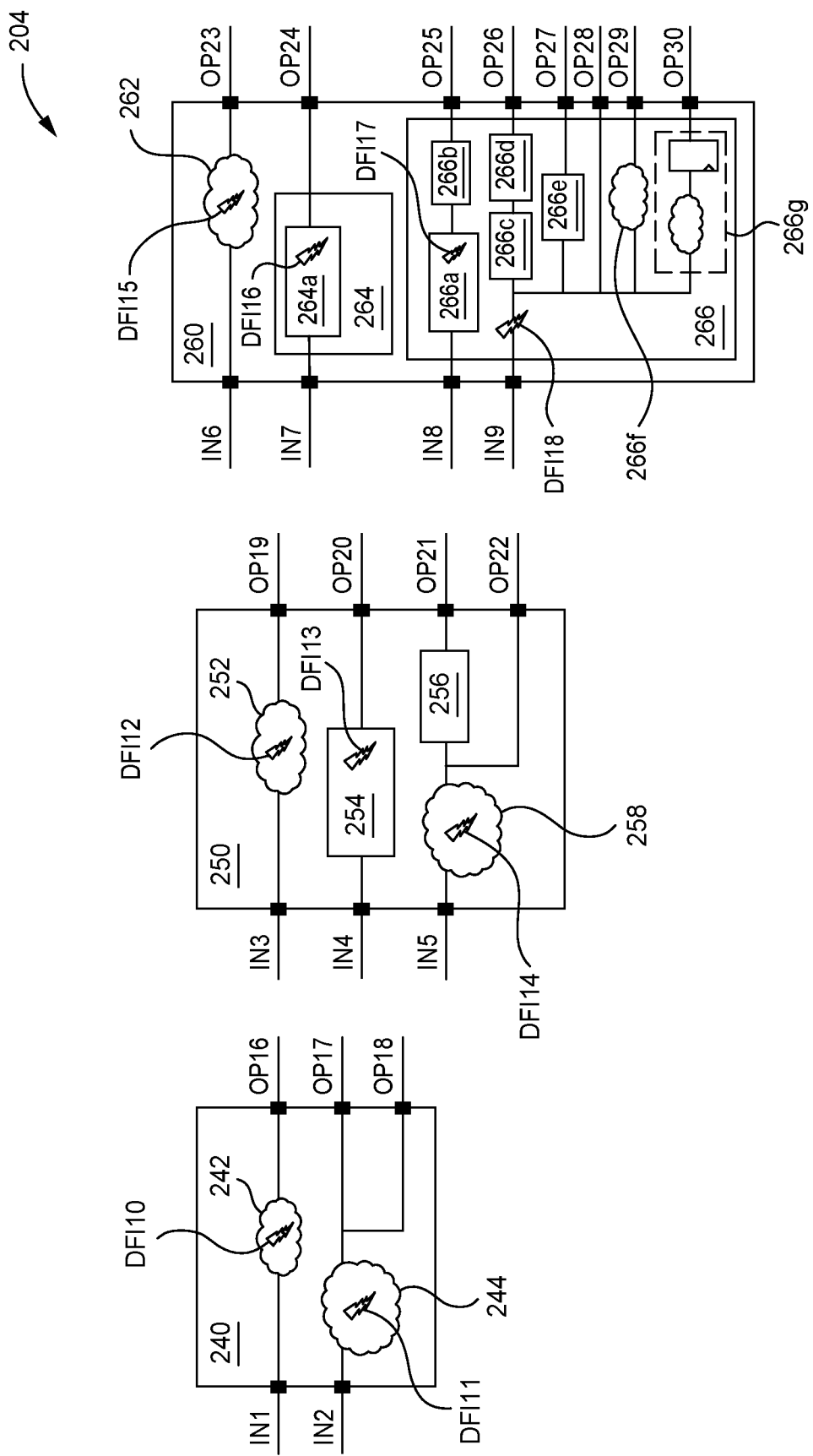
FIG. 2B illustrates example dependent failure initiators, according to one or more examples.

FIG. 2A and FIG. 2B illustrate diagrams 202 and 204 of example external and internal SDFs. External SDFs occur outside a corresponding circuit block and are coupled into the circuit block via an input (e.g., DFI1). Blocks 210-230 of FIG. 2A correspond to example external SDFs. Internal SDFs occur within one or more elements of a circuit block. Blocks 240-260 of FIG. 2B correspond to example internal SDFs. The blocks 210-260 may be portions of one or more circuit designs. In block 210, a fault caused by DFI1 propagates to output OP1 through a circuit 212, for example, a combinational logic represented by a cloud. Further, in block 210, a fault caused by DFI2 propagates to outputs OP2 and OP3 through a circuit 214, for example, a combinational logic. In block 220, a fault caused by DFI3 propagates to output OP4 through a circuit 222, for example, a combinational logic. Further, in the block 220, a fault caused by DFI4 propagates to OP5 through a sub-hierarchy circuit 224, and a fault caused by DFI5 propagates to output OP6 through a sub-hierarchy circuit 226 and output OP7 as a feedthrough. A sub-hierarchy circuit (e.g., the sub-hierarchy circuit 224 or 226) is a self-contained circuit of the corresponding circuit block. The circuit 222 includes multiple circuit elements and may include multiple levels of hierarchy. In block 230, a fault caused by DFI6 propagates to output OP8 as a feedthrough, and a fault caused by DFI7 propagates to output OP9 through a sub-hierarchy circuit 232, which further includes a sub-hierarchy circuit 232a. Further, in block 230, a fault caused by DFI8 propagates to output OP10 through sub-hierarchy circuits 234a and 234b of sub-hierarchy circuit 234, and a fault caused by DFI9 propagates to output OP11 through sub-hierarchy circuits 234c and 234d of the sub-hierarchy 234, to output OP12 through sub-hierarchy circuit 234e of the sub-hierarchy circuit 234, to the output OP13 as feedthrough, to the output OP14 via the circuit 236 of the sub-hierarchy circuit 234, and to the output OP15 via the circuitry 238.

In the block 240, the DFI10 occurs within the circuitry 242 and propagates to the output OP16. Further, the DFI11 occurs within the circuitry 244 and propagates to the outputs OP17 and OP18. The DFI10 and DFI11 occur within the block 240, and are internal SDFs. In the block 250, the DFI12 occurs within circuitry 252 and propagates to the output OP19, and the DFI13 occurs within the sub-hierarchy circuit 254 and propagates to the output OP20. Further, in the block 250, the DFI14 occurs within the circuitry 258 and propagates to the output OP21 via the sub-hierarchy circuit 256 and to the output OP22 via a feedthrough. The DFI12, the DFI13, and the DFI14 occur within the block 250, and are internal SDFs. In the block 260, the DFI14 occurs within the circuitry 262 and propagates to the output OP23.

In the block 260, the DFI15 occurs within the circuitry 262 and propagates to the output OP23, and the DFI16 occurs within the sub-hierarchy circuit 264a of sub-hierarchy circuit 264, and propagates to the output OP24. Further, in the block 260, the DFI17 occurs within the sub-hierarchy circuit 266a of the sub-hierarchy circuit 266 and propagates to the output OP25 via the sub-hierarchy circuit 266b of the sub-hierarchy circuit 266. Additionally, in the block 260, the DFI18 occurs within the sub-hierarchy circuit 266. The DFI18 propagates to the output OP26 via the sub-hierarchy circuits 266c and 266d of the sub-hierarchy circuit 266. Further, the DFI18 propagates to the output OP27 via the sub-hierarchy circuit 266e of the sub-hierarchy circuit 266, and to the output OP28 via feedthrough. The DFI18 propagates to the output OP29 via the circuitry 266f of the sub-hierarchy circuit 266, and to the output OP30 via the circuitry 266g of the sub-hierarchy circuit 266.

In one or more examples, an SDF may correspond to a drop in a voltage level of a signal (e.g., a power supply signal or another signal). For example, the voltage level of the power supply may drop below a threshold of operation for the corresponding circuit block. In other examples, an SDF may correspond to a clock signal corrupted by jitter, a clock signal corrupted by extra clock transitions, or a clock signal corrupted by missing clock transitions, that is feeding into multiple sequential circuit elements. A shared clock signal is received by two or more circuit elements. In one or more examples, the shared clock signal may function as a coupling factor that enables dependent failures to occur within the corresponding circuit design. In another example, an SDF may be a corrupted reset signal controlling multiple circuit blocks that may have parasitic transitions (e.g., a transition from a logic one to a logic zero, or from a logic zero to a logic one). Accordingly, the corrupted reset signal may cause inadvertent resets to multiple blocks within a circuit design. In one or more examples, SDFs may be exemplified by shared resources that are malfunctioning, such as, for example, a malfunctioning random access memory, or another circuit element, that is shared by multiple processors.

In examples where multiple coupling factors are involved, the SDF, which may impact a number of outputs of one or several modules, can be considered as a DFI causing common cause failures (CCFs). ISO 26262 defines the CCF as a failure of two or more elements of a circuit resulting directly from a single specific event or root cause which is either internal or external to all of these elements.

External SDFs and internal SDFs can additionally cause dependent failures. As is described in further detail in the following, external and internal SDFs are analyzed in the context of CCFs to determine the effects of the SDF. Any element in the path of the propagation can be subject to an SDF. Coupling elements corresponding to potential coupling factors (CFs) involved in the propagation of CCFs may further provide propagation paths for the dependent failures. An output that may be affected by two or more SDFs may be referred to as a shared resource output. These shared resource outputs can be arrived at by forwarding path annotation starting from an SDF. In one or more examples, a fault from SDF may propagate to multiple outputs via branches (e.g., coupling elements). Accordingly, a fault from one SDF may affect multiple outputs.

A cone of influence may be determined by tracing the propagation path of a fault from an SDF to an output or outputs (e.g., observation point). A cone of influence is a set of cells of a circuit that may impact one or more observation points. A cone of influence may be superimposed over a portion of a circuit to identify cells of the circuit design that have a potential impact on a given observation point. In one or more examples, cells for a cone of influence are defined by forward-tracing through the connectivity of a circuit design from one or more SDF inputs to the affected outputs. In another example, cells for a cone of influence are defined by back-tracing through the connectivity of a circuit design from an observation point of an affected output to one or more SDF inputs. In one or more examples, cells for a cone of influence are defined by back-tracing and forward tracing through the connectivity of a circuit design. One or more observation points may be used to define a cone of influence. In one example, the observation point is an output of the block of the circuit design under evaluation. Further, one or more cells of one a cone of influence may be included in another cone of influence. As will be described in more detail in the following, such cell may be referred to as shared resources.

Throughout the following description, a cone of influence may be referred to as a cone. In one or more examples, determining (carving) a cone includes identifying (e.g., tagging) the elements of a propagation paths from an SDF to an observation point (e.g., output). For example, the elements and interconnecting nodes of a propagation path from an input to the output(s) are identified based on the corresponding cone.

Figure 3:
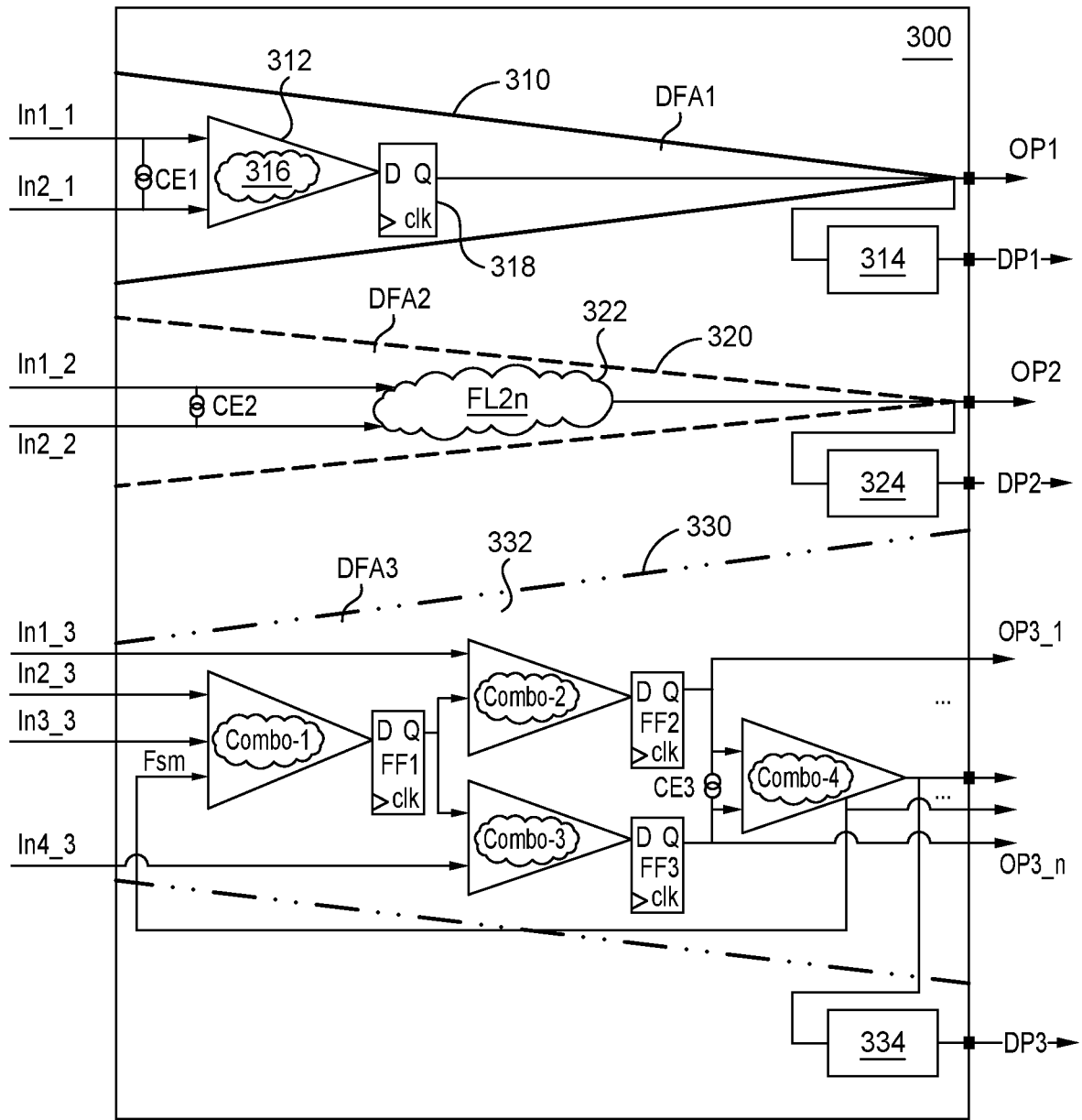
FIG. 3 illustrates example cones of influence for a circuit block, according to one or more examples.

FIG. 3 depicts example cones, according to one or more examples. FIG. 3 illustrates a circuit block 300 and cones 310, 320, and 330. The circuit block 300 is a portion of a circuit design (e.g., the circuit design 132 of FIG. 1). In this context, a cone of influence is determined by defining a set of cells of a block of a circuit design that may impact one or more observation points. Determining a cone of influence may be referred to as carving a cone of influence.

The cones 310, 320, and 330 may be defined in a manner that includes traversal (e.g., back-tracing, forward-tracing, or both) of all cells involved from the origination of the SDF input, propagating via coupling elements or shared resources to outputs (e.g., observation points), such as the outputs OP of the block (or element or module). The outputs impacted by the SDF are identified as being part of the cone and associated with the shared resources or other coupling factors of the cones 310, 320, and 330.

Probabilities for error propagation from the SDFs to the outputs are computed based on the entire circuit block. In one example, endpoints (e.g., flip-flops, ports, and hierarchies, among others) of a propagation path are traversed through the output ports. For example, a structural analysis based on inputs, outputs, and identified SDFs, by back-tracing circuit logic back from one or more outputs and/or forward tracing from one or more inputs is used to traverse endpoints of a propagation path.

As illustrated in FIG. 3, the cone 310 starts from inputs In1_1 and In2_1, includes circuitry 312, and ends at output OP1. The cone 320 starts at the inputs In1_2 and In2_2, includes circuitry 322 and ends at output OP2. The cone 330 starts at the inputs In1_3, In2_3, In3_3, and In4_3, includes circuitry 322, and ends at the outputs OP3_1 to OP3_$n$, where n is greater than 1. The inputs In1_1, In2_1, In2_2, In1_3, In2_3, In3_3, and In4_3 are SDFs. Further, the outputs OP1, OP2, and OP3_1 to OP3_$n$ are observation points. The cones 310, 320, and 330 are stored in the memory 130.

SDF inputs to the element resulting from an external root cause, or internal root cause, may propagate through common (e.g., shared resources). A shared resource may be included within more than one cone and may contribute to dependent failures in more than one cone. Further a shared resource may include buses, clock-tree, reset-tree, scan/testability, or debug signals, and the like.

With further reference to FIG. 1, the evaluation engine 110 determines a severity (weightage) level of dependent failures in a block of a circuit design (e.g., the circuit design 132). The evaluation engine 110 determines a cell area for the block and corresponding cones of influence under evaluation. The cell area is determined based on a summation of all cell areas within the block and within the corresponding cones of influence. In one example, the cell area is the combined area of the gates of the devices and transistors within the circuit design 132. For example, with reference to FIG. 3, the evaluation engine 110 determines the area of the cone 310 as 100 units, the area of the cone 320 as 300 units, and the area of the cone 330 as 600 units. Further, the area of the block 300 is determined to be 1000 units. The cone 310 corresponds to dependent failure DFA1, the cone 320 corresponds to dependent failure DFA2, and the cone 330 corresponds to dependent failure DFA3. Units correspond to a number of circuit elements within a cone.

The severity (weightage) value of the dependent failure for a cone is determined based on a ratio of the area of the cone to an area of the corresponding block of the circuit design. For example, the severity (weightage) value of the cone 310 (e.g., dependent failure DFA1) is (100 units)/(1000 units) or 10 percent. Further, the severity (weightage) value of the cone 320 (e.g., dependent failure DFA2) is (300 units)/(1000 units) or 30 percent, and the severity (weightage) value of the cone 330 (e.g., dependent failure DFA3) is (600 units)/(1000 units) or 60 percent. The severity (weightage) value determined for each cone is stored within the memory 130.

The impact of an SDF on a corresponding cone impacts the quantitative measure (e.g., diagnostic coverage) due to the dependent failure effects and any other safety related parameters used in the evaluation of the safety performance of the circuit design. In one example, the safety performance is measured through functional safety performance metrics. For example, the functional safety performance metrics comply with an Automotive Safety Integrity Level (ASIL). ASIL is a risk classification scheme defined by the ISO standard 26262—Functional Safety for Road Vehicles. In other examples, the safety performance may be defined by other standards.

With reference to FIG. 3, each of the cones 310, 320, and 330 of the block 300 has a corresponding safety circuitry. For example, the cone 310 has an associated safety circuitry 314, the cone 320 has an associated safety circuitry 324, and the cone 330 has an associated safety circuitry 334.

The safety circuitries 314, 324, and 334 detect faults within the primary function circuitry of the respective cones 310, 320, and 330. In one example, the percent of failures (faults) detected corresponds to the diagnostic coverage of the cones 310, 320, and 330. The diagnostic coverage represents the ratio of dangerous faults that can be detected to the total dangerous faults that could occur. In one specific example, the diagnostic coverage is expressed as a percentage. The diagnostic coverages of the three cones 310, 320, and 330 in this example are designated to be 90%, 99% and 60% respectively. The diagnostic coverages may be impacted based on the occurrence of a dependent failure. As the diagnostic coverage is based on the fault locations within the area of the corresponding cone, the impact of an SDF on the corresponding cone area may also influence the diagnostic coverage.

The safety circuitries 314, 324, and 334 detect failures by receiving an output signal of each respective cone, and comparing the output signal to an expected range of values. If the output signal is outside the expected range of values, a failure may be declared by the corresponding safety circuitries 314, 324, and 334.

The cone 310 includes sources of dependent failures In1_1 and In2_1, circuitry 316, and flip-flop 318. In an example, when the source of dependent failures In1_1 causes a dependent failure in the cone 310 of DFA1, the dependent failure may bring down the diagnostic coverage of the safety circuitry 314. For example, a dependent failure may reduce the ability for the safety circuitry 314 to detect a fault from 90 percent to less than 90 percent (e.g., about 0 percent to about 90 percent). The dependent failure may inhibit the fault propagation to the safety circuitry (e.g., a safety mechanism) 314, reducing the ability for the safety circuitry 314 to detect a fault within the circuity 316 and/or the flip-flop 318. In one or more examples, the source of dependent failures In1_1 may correspond to a failed power supply. The failed power supply may reduce the power supply of the safety circuitry 314, reducing the functionality of the safety circuitry 314, and the ability of the safety circuitry 314 to detect failures within the corresponding cone.

In one or more examples, the entire block 300 may be connected to a single safety circuitry. In such an example, the severity (weightage) values for each cone may be used to commensurate the effect from each cone on the diagnostic coverage of the block 300. The impact of SDF severity (weightage) values can influence the measures used to address SDFs and mitigate dependent failures.

In one example, two cones overlap with each. Overlapping cones have at least one common resource (e.g., a shared resource). A shared resource may adversely affect the circuit elements of each cone. For example, a shared resource may propagate a failure from one cone to another cone. Accordingly, to determine diagnostic coverage of a block, the shared resources are identified and used to determine the diagnostic coverage of the block.

Figure 4:
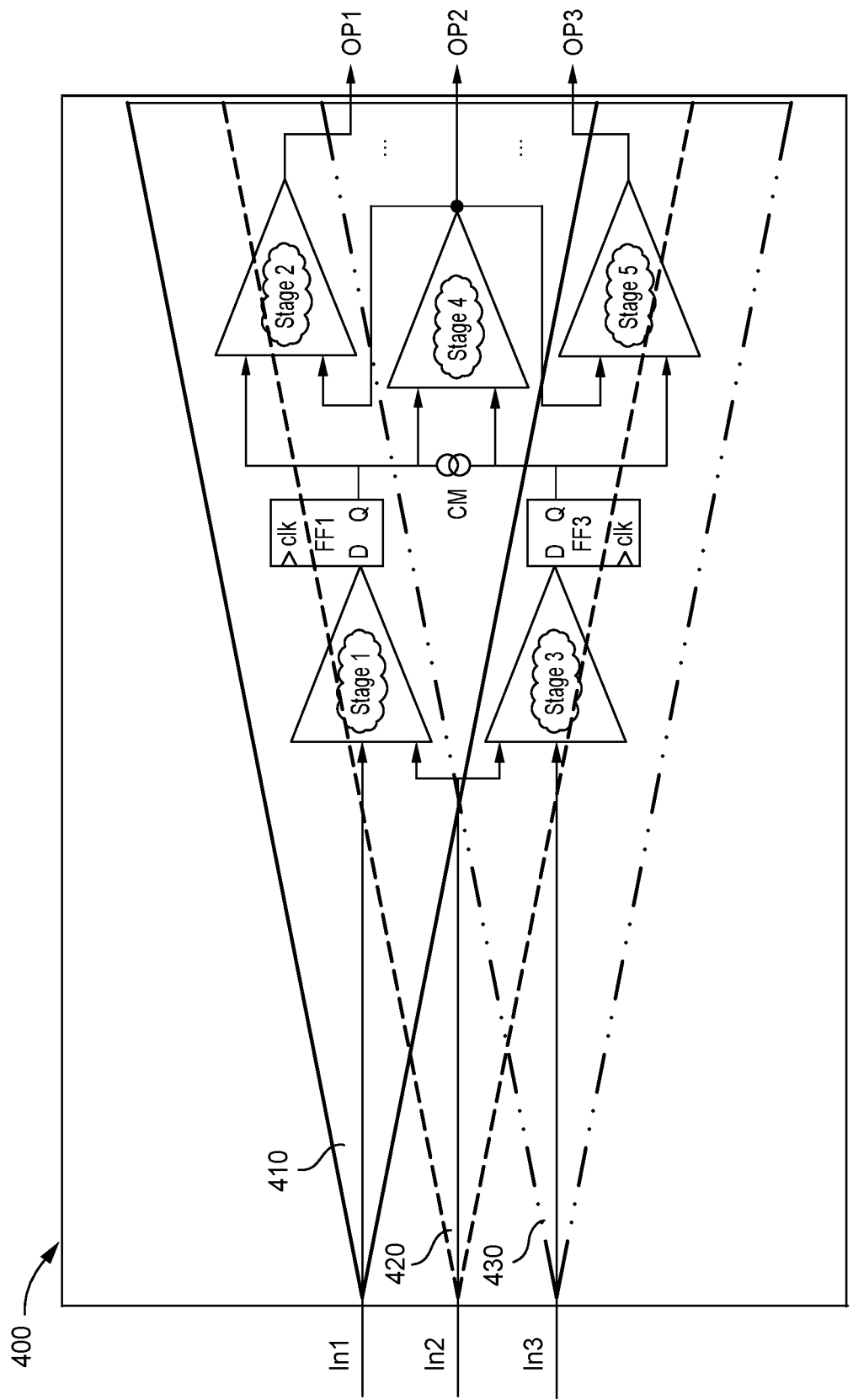
FIG. 4 illustrates example cones of influence for a circuit block, according to one or more examples.

FIG. 4 depicts a schematic diagram 400 of intersecting (e.g., overlapping) cones 410, 420, and 430. The cones 410, 420, and 430 are determined by the evaluation engine 110 as described above. Further, the intersecting cones 410, 420, and 430 are used to determine shared resources and other coupling factors between the intersecting cones. The evaluation engine 110 determines the cones 410, 420, and 430 starting from a respective input (e.g., input In1, In2, and In3) of dependent failures (SDFs) and by traversing through all timing stop points, flip-flops, ports and hierarchies of the corresponding circuitry until a respective output or outputs (e.g., output port OP1, OP2 and OP3) is reached.

The cone 410 is determined by tracing the signal path from input In1 to outputs OP1 and OP2. The cone 410 may be defined in the context of an electrical or electronic circuit description, having at least one input and at least one output. The cone 410 further includes at least one electric or electronic device such as a transistor, diode, resistor, capacitor, inductor, etc., and the connectivity network that establishes the topology of the said electric or electronic circuit, between the input(s) and the output(s). The cone 410 may be hierarchically represented through interconnecting blocks that may be described either behaviorally through the intended functionality, or structurally through the electric or electronic circuit description, as interconnected electrical or electronic devices. In a forward-tracing determination mode, the boundaries of the cone 410 throughout the electrical or electronic circuit description are established by the propagation paths of a signal from the input In1 to one or more of the outputs OP1, OP2, and OP3 through the electrical or electronic devices interconnected in the circuit configuration. In one example, in a backward-tracing determination mode, the cone 310 may be described by establishing propagation paths from one or more of the outputs OP1, OP2, and OP3 to one or more of the inputs In1, In2, and In3 through the interconnected electrical or electronic devices in the circuit configuration. As the cone 410 is determined, the circuit elements detected along the path of the cone 410 are labeled as being part of the cone 410.

The cone 420 is determined by tracing the signal path from input In2 to outputs OP1, OP2, and OP3. The cone 420 is determined starting from the input In2 and following the input signal propagation paths through the interconnecting circuit elements to the corresponding output(s), labeling these resources correspondingly. In one example, when determining the cone 420, the input signal propagation paths may reach circuit elements or connectivity nodes that are part of the cone 410. In such instances, when the signal path of cone 410 is intersecting with the signal path of cone 420, a shared resource is identified and labeled appropriately. For example, in FIG. 4, circuit block stage 1, circuit block stage 2, circuit block stage 4, and flip-flop FF1 are shared resources. The shared resource may be an electrical or electronic device, a signal (interconnecting node), or a hierarchical circuit block.

The cone 430 is determined by tracing a signal path from input In3 to the outputs OP1, OP2, and OP3. The cone 430 is determined starting from the input In3 and following the input signal propagation paths throughout the interconnecting circuit elements until one or more of the outputs OP1, OP3, and OP3 is reached. The identified resources are correspondingly labeled as being part of the cone 430. While carving the cone 430, circuit elements that are already part of one or more of the cone 410 and the 420 may be identified based on corresponding labels. In such instances, based on a determination that a signal path of the cone 410 or 420 intersects with the signal path of the cone 430, one or more shared resources are identified and labeled appropriately. For example, the circuit block stage 3, the circuit block stage 4, the circuit block stage 5, and the flip-flop FF3 are determined to be shared resources between the cones 420 and 430. Further, the block stage 4 is determined to be shared resources between the cones 410 and 430. In one or more examples, circuit elements that are defined as shared resources between cones 410 and 420 are also identified as being part of the cone 430, are not further labeled as such circuit elements are already labeled as being shared resources. In one example, signal paths at output OP2 passes through the block stage 2 to the output OP1, and the signal path at output OP2 passes through the block stage 5 to the output OP3. Accordingly, the signal at output OP2 is a shared signal with the potential for propagating dependent failures to the outputs OP1 and OP3.

The identified shared resources and corresponding labels are stored within the memory 130.

Figure 5:
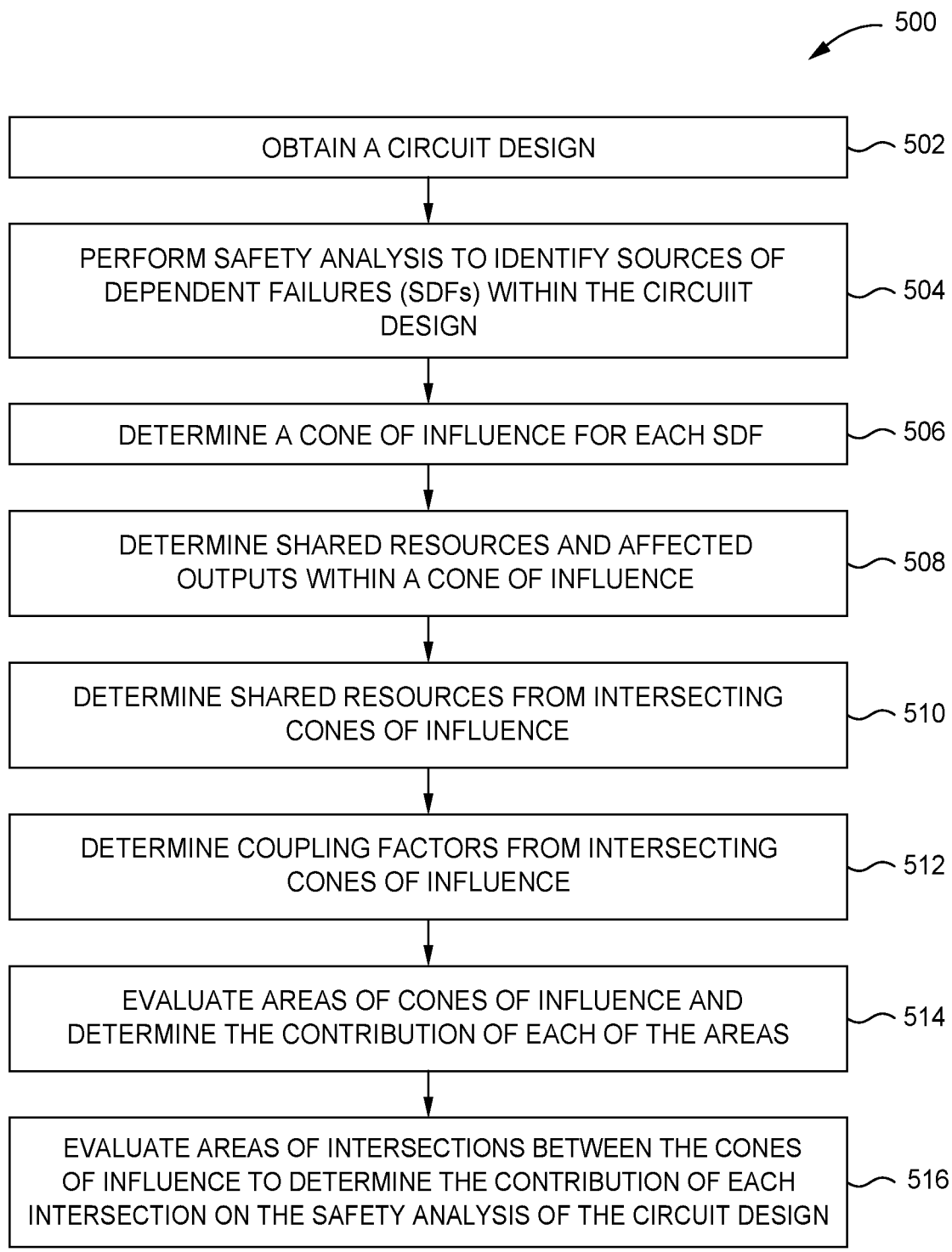
FIG. 5 illustrates a flowchart of a method for determining cones of influence and corresponding contributions, according to one or more examples.

FIG. 5 illustrates a flowchart of a method 500 for detecting shared resources in a circuit design, according to one or more examples. The method 500 is performed by the circuit evaluation system 100. For example, a one or more processors of the evaluation system 100 executes instructions to perform the method 500.

At 502 of the method 500, a circuit design is obtained. For example, with reference to FIG. 1, the evaluation engine 110 obtains the circuit design 132 from the memory 130. At 504 of the method 500, safety analysis is performed to identify SDFs within the circuit design. In one example, with reference to FIG. 1, the evaluation engine 110 performs safety analysis to identify the coupling factors of the circuit design 132. In one example, the evaluation engine 110 obtains the SDFs from the memory 130. In one example, the evaluation engine 110 identifies one or more SDFs of the circuit design. The safety analysis includes performing a failure mode analysis. For example, a failure mode analysis may include a design failure mode and effect analysis or fault tree analysis, among others. Example SDFs are illustrated in FIG. 2A and FIG. 2B.

At 506 of the method 500, a cone of influence is determined for each SDF. With reference to FIG. 1, the evaluation engine 110 determines a cone for each SDF. The evaluation engine 110 determines a cone using the SDF as the original point, and the apex of the cone. In one example, the cone is determined using a forward tracing method as is described above with regard to FIGS. 2-4. The signal propagation within proceeds from the SDF to the corresponding output port or ports. The signal propagation transcends the timing stop points, for example, the flip-flops, ports or sub-hierarchies along the signal propagation path.

In one example, with reference to FIG. 1 and FIG. 4, the evaluation engine 110 determines the cones 410, 420, and 430 from the circuit design 132 using a forward-tracing process starting from the inputs In1, In2, and In3 (SDFs) and stopping at the outputs OP1, OP2, and OP3. The cone 410 is determined to include the circuit block stage 1, the flip-flop FF1, the circuit block stage 2, the circuit block stage 4, and the outputs OP1, OP2, and OP3. The cone 420 is determined to include the circuit block stage 1, circuit block stage 2, circuit block stage 3, circuit block stage 4, the flip-flops FF1 and FF3, and the outputs OP1, OP2, and OP3. The cone 430 is determined to include the circuit block stage 3, the flip-flop FF3, the circuit block stage 4, the circuit block stage 5, and the outputs OP1, OP2, and OP3.

The determined cones, e.g., the cones 410, 420, and 430, and corresponding circuit elements are stored in the memory 130.

At 508 of the method 500, shared resources and affected outputs are determined within a cone of influence. With reference to FIG. 1 and FIG. 4, the evaluation engine 110 determines the shared resources and affected outputs from the cones 410, 420, and 430. As is described above, a shared resource is a circuit element that is included within two or more cones. In one example, shared resources and affected outputs are determined within a cone through the intersection of two sub-cones.

Figure 6:
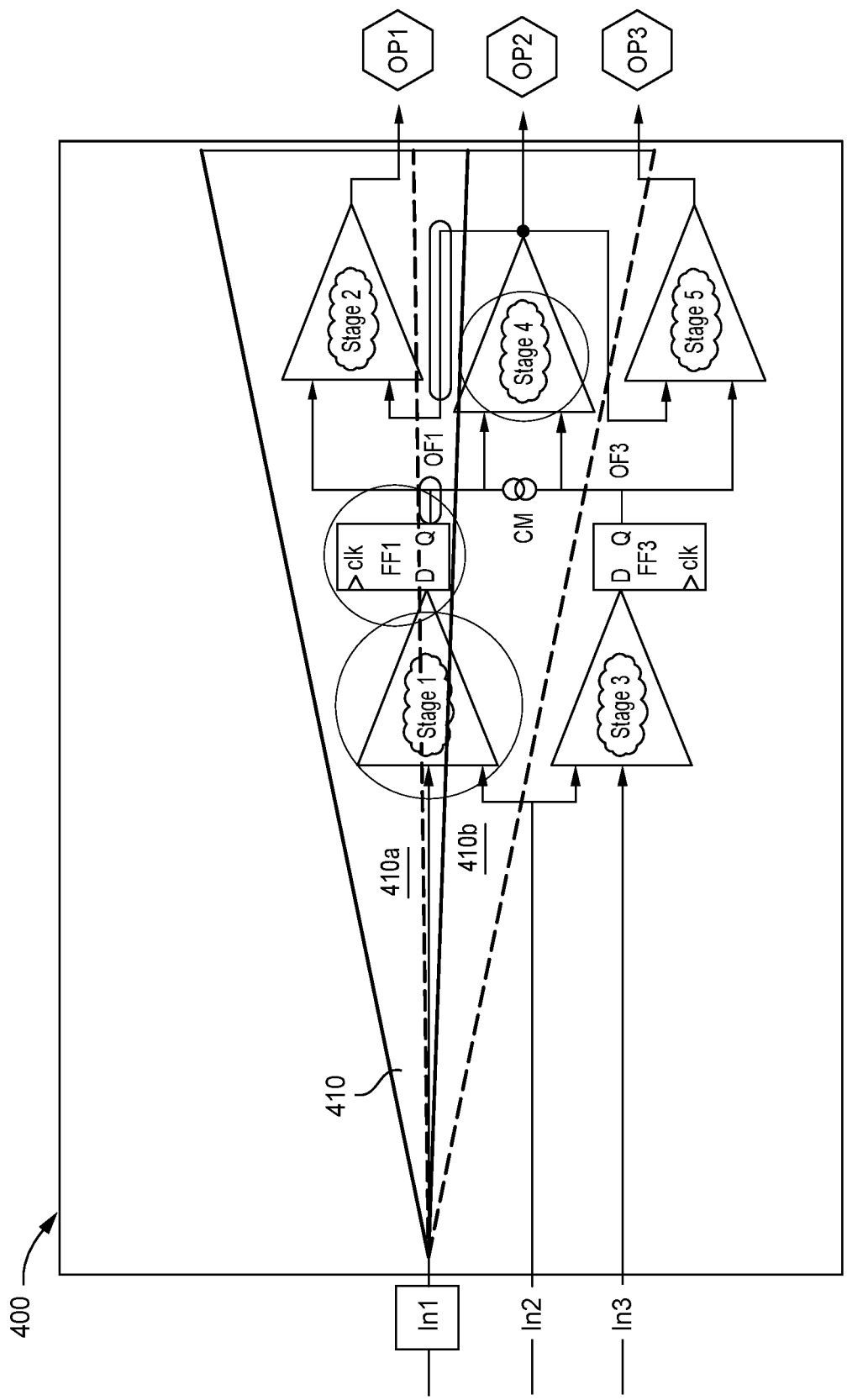
FIG. 6 illustrates example sub-cones of influence for a circuit block, according to one or more examples.

FIG. 6 illustrates the cone 410 and corresponding shared resources and affected outputs, according one or more examples. The shared resources are identified within the cone 410, through the intersection of two sub-cones 410a and 410b that are determined from the input In1 to the output OP1, and from the input In1 to the output OP2, respectively. The signal at input In1 propagates on a common signal path through circuit block stage 1 and flip-flop FF1, branching out as the shared signal at node OF1 to reach output OP1 through cascading circuit block stage 2, and output OP2 through cascading circuit block stage4. The sub-cone 410a is defined by tracing the signal path from input In1 through the shared circuit block stage 1 and the shared flip-flop FF1, and branching out through the cascading block stage 2, to reach the output OP1. The sub-cone 410b is determined by tracing the signal path from input In1 to output OP2 through the shared circuit block stage 1 and the shared flip-flop FF1, and branching out through the cascading circuit block stage 4, to reach the output OP2. The intersection of the two sub-cones 410a and 410b yields the shared resources within the cone 410. Accordingly, the circuit block stage 1 and flip-flop FF1, and the branching node OF1 are identified as shared resources between outputs OP1 and OP2 within the cone 410, from the overlap between the two sub-cones 410a and 410b.

Further, the output OP1 can be reached from node OF1 by an alternative signal path through the circuit block stage 4 and the cascading block stage 2. Accordingly, the block stage 4 and the branching output OP2 are identified as shared resources for the output OP1 within cone 410. The output OP3 is associated with shared resources of one or more of the outputs OP1 and OP2. For example, the output OP3 can be reached indirectly from input In1 through the circuit block stage 4 and the branching output OP2. Accordingly, the block stage 4 and the branching output OP2 are identified as shared resources for the output OP3 within the cone 410.

Figure 7:
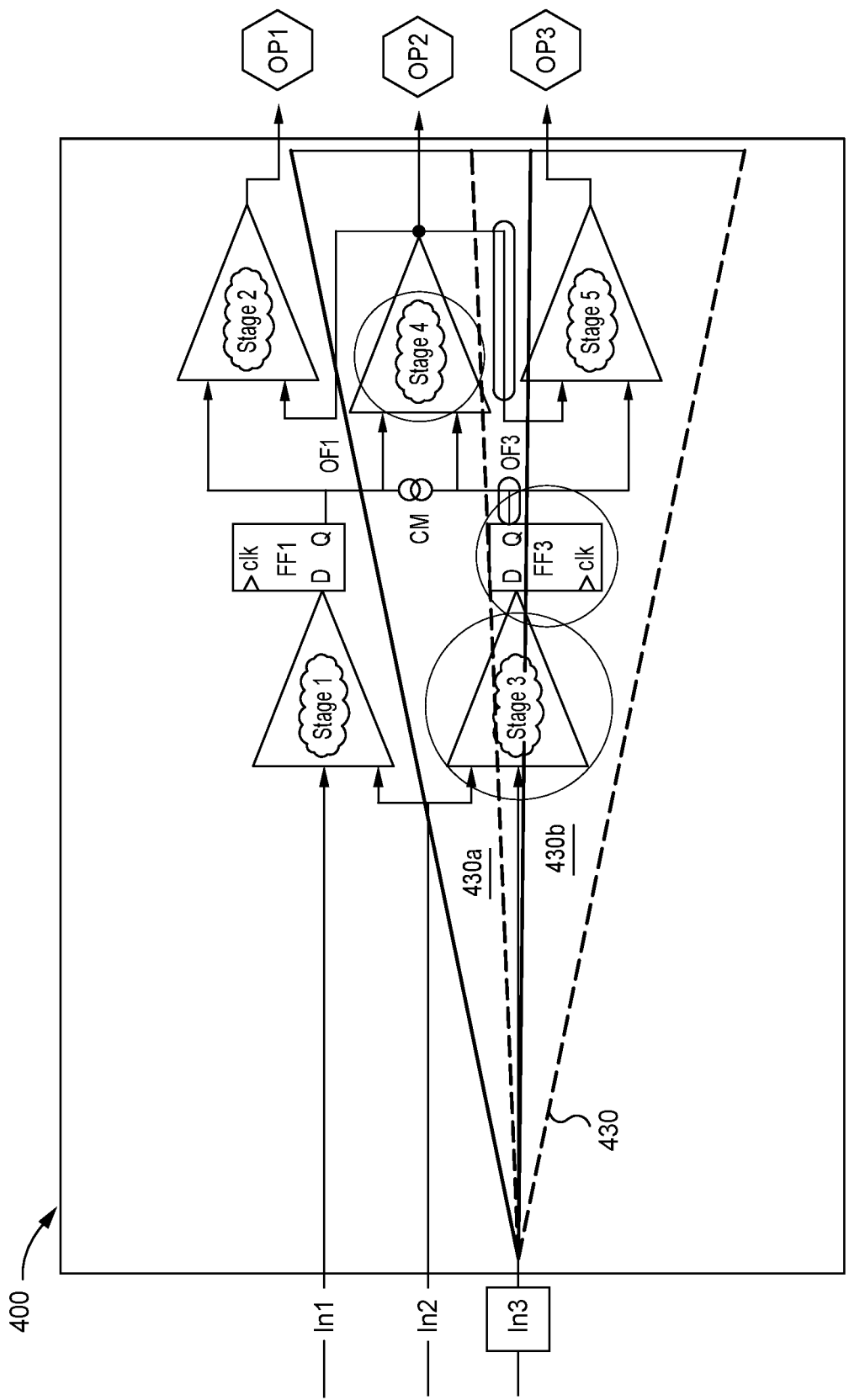
FIG. 7 illustrates example sub-cones of cones of influence for a circuit block, according to one or more examples.

FIG. 7 illustrates the cone 430 and corresponding shared resources and affected outputs, according to one or more examples. The cone 430 includes intersecting sub-cones 430a and 430b. The intersecting sub-cones 430a and 430b are determined from the input In3 to the output OP3, and from the input In3 to the output OP2, respectively. The input In3 propagates on a common signal path through the circuit block stage 3 and flip-flop FF3, branching out at the shared node OF3, and reaching the output OP3 through cascading circuit block stage 5, and output OP2 through cascading circuit block stage 4. The sub-cone 430a of the cone 430 is determined by tracing the signal path from the input In3 through the shared circuit block stage 3 and the shared flip-flop FF3, and branching out through the cascading circuit block stage 5, to reach the output OP3. The sub-cone 430b of the cone 430 is determined by tracing the signal path from input In3 to output OP3 through the shared circuit block stage 3 and the shared flip-flop FF3, and branching out through the cascading circuit block stage 4, to reach the output OP2. The intersection of the two sub-cones 430a and 430b yields the shared resources within the cone 430. Accordingly, the circuit block stage 3 and flip-flop FF3, and the branching node OF3 are identified as shared resources between outputs OP3 and OP2 within the cone 430, due to the overlap between the two sub-cones 430a and 430b.

Further, the output OP3 can be reached from node OF3 by the signal path through circuit block stage 4 and circuit block stage 5. Accordingly, the circuit block stage4, and the branching output OP2 are identified as shared resources for the output OP3 within cone 430. The output OP1 can be reached indirectly from the input In3 through the circuit block stage 4 and the branching output OP2. Accordingly, the circuit block stage 4 and the branching output OP2 are identified as shared resources for OP1 within the cone 430.

In one or more examples, the shared resources within a cone (e.g., the cone 410 or the cone 430) are used to determine whether or not failures from a single SDF affect multiple outputs of the cone. For example, a shared resource may couple a failure from a first propagation path within the cone 410 to another propagation path within the cone 410.

Figure 8:
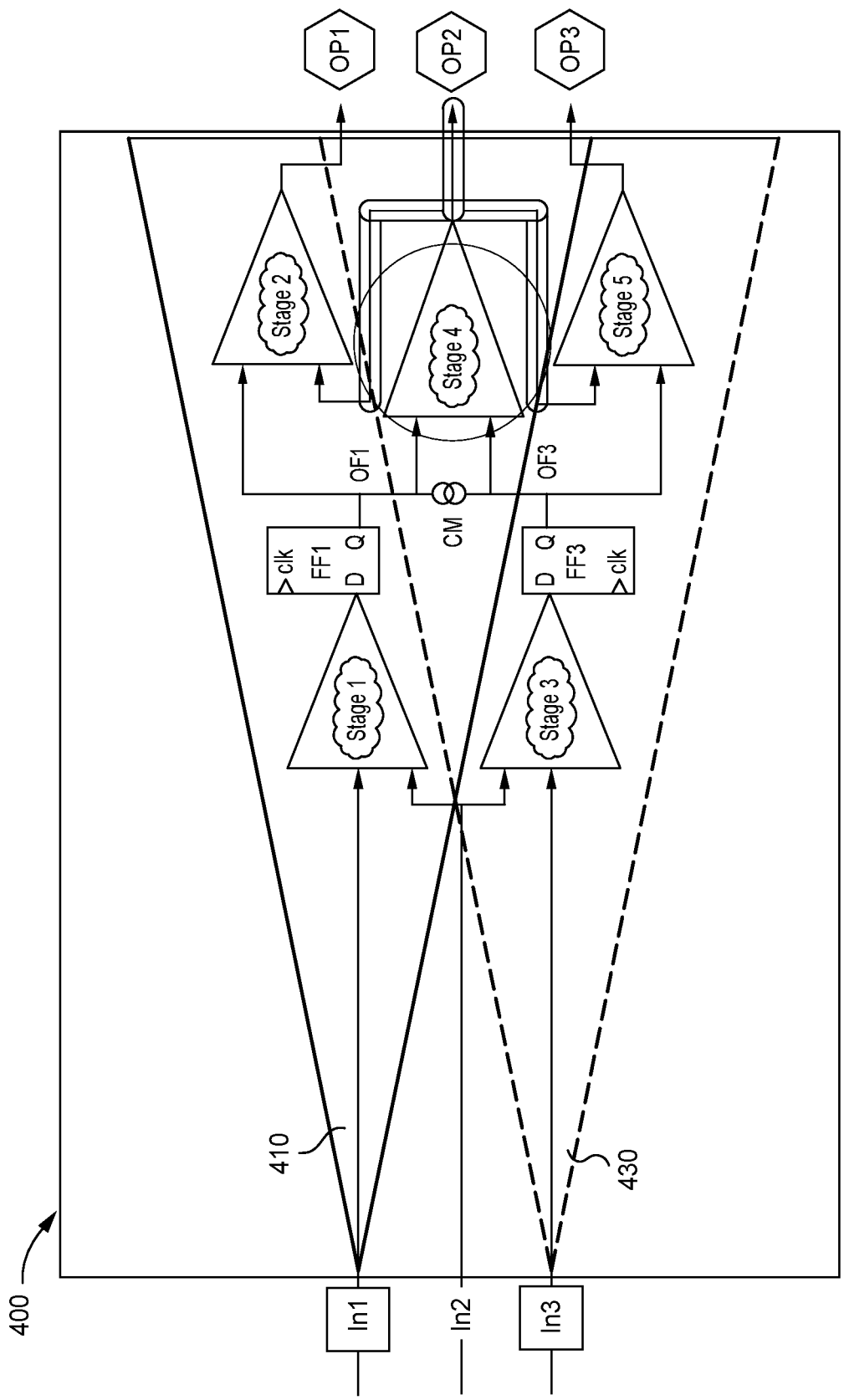
FIG. 8 illustrates example processed cones of influence for a circuit block, according to one or more examples.

With further reference to FIG. 5, at 510, shared resources between intersecting cones of influence are determined. For example, with reference to FIG. 1, the evaluation engine 110 determines shared resources from the intersecting cones stored within the memory 130. FIG. 8 illustrates intersecting cones 410 and 430. In FIG. 8, shared resources between cones 410 and 430 are determined by the evaluation engine 110 by determining the blocks and signal paths that are identified to be in both the cones 410 and 430. The output OP2 can be reached from either input In1 or input In3 through the circuit block stage 4. The cone 410 features a signal path from the input In1 to the output OP3 through the circuit block stage 4 with branching output OP2, and the circuit block stage 5, and through the coupling mechanism CM. The cone 430 features a signal path from input In3 to the output OP1 through the circuit block stage 4 with branching output OP2 and circuit block stage 2 and through the coupling mechanism CM. Accordingly, the circuit block stage 4 and output OP2 are identified as shared resources between the output OP1 of the cone 410 and the output OP3 of the cone 430. The identified shared resources are stored in the memory 130.

Figure 9:
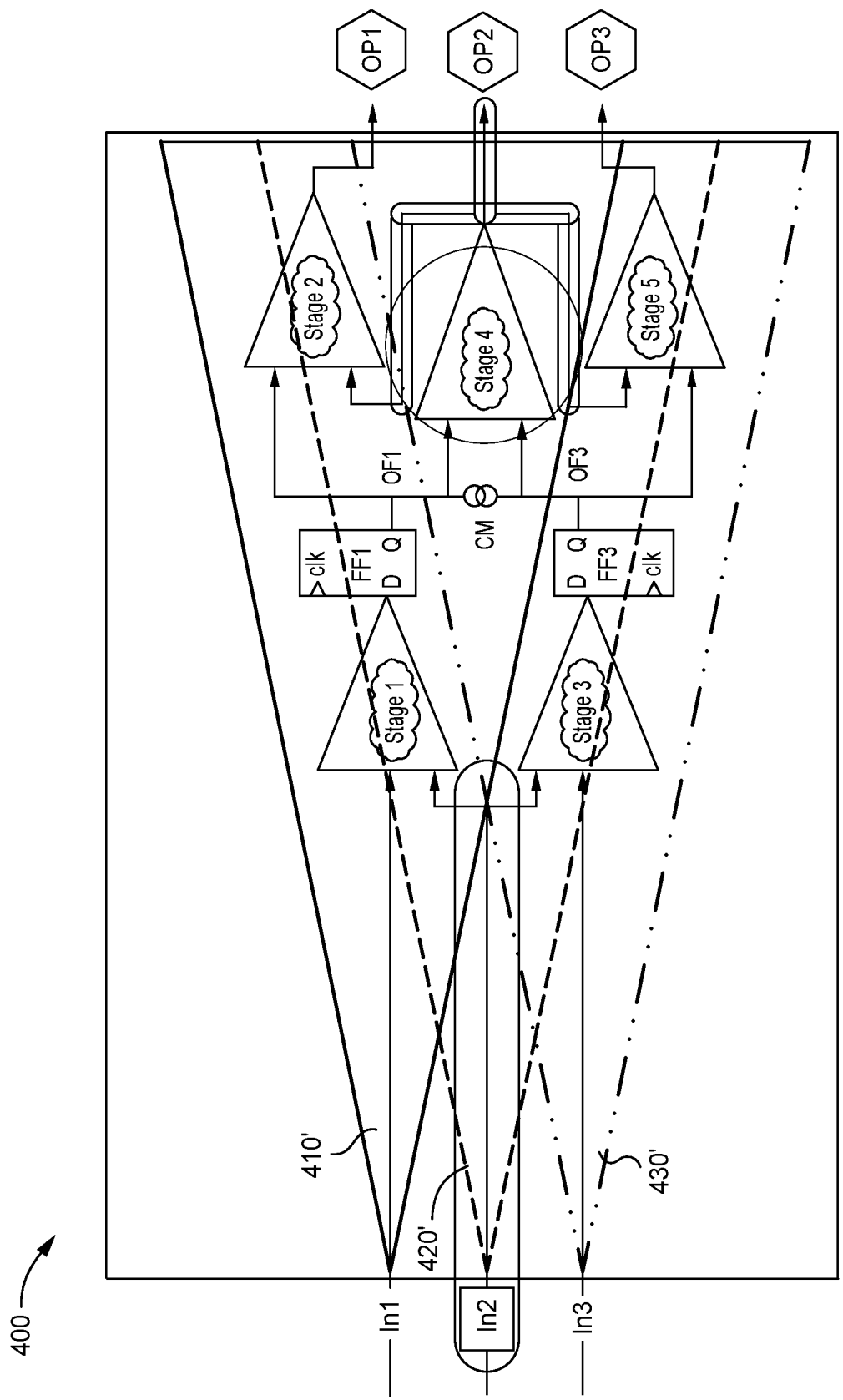
FIG. 9 illustrates example intersecting cones of influence for a circuit block, according to one or more examples.

In FIG. 9, the cones 410, 420, and 430 are processed to identify techniques that may be applied to the corresponding circuit design to mitigate effects of failures that occur at the shared resources. The resulting processed cones are 410' and 430'. The cone 420' is the processed cone 420. The cone 420' may be used to identify that input In2 is a shared resource that has the potential to become a source for dependent failures. In one example, the traversal from the input In2 to the outputs OP1 and OP3 of cone 420' is performed through the branching signal path In2, identifying this signal as a shared resource at the intersection of 410', 420' and 430'. The shared resource In2 is processed to mitigate the potential for dependent failures. For example, effects corresponding to failures at In2 are mitigated such that the failures do not affect downstream elements. In one example, safety circuitries may be added to the corresponding circuit design to mitigate the effects of a failure at In2. The safety circuitry may identify potential failures and mitigate (e.g., prevent) the failures from propagating to other circuit blocks. Additionally, or alternatively, signal paths may be added (or improving the robustness in signals in other ways) to the corresponding circuit design to mitigate the effects of a failure at In2. In one or more examples, the identified shared resources are stored in the memory 130.

Figure 10:
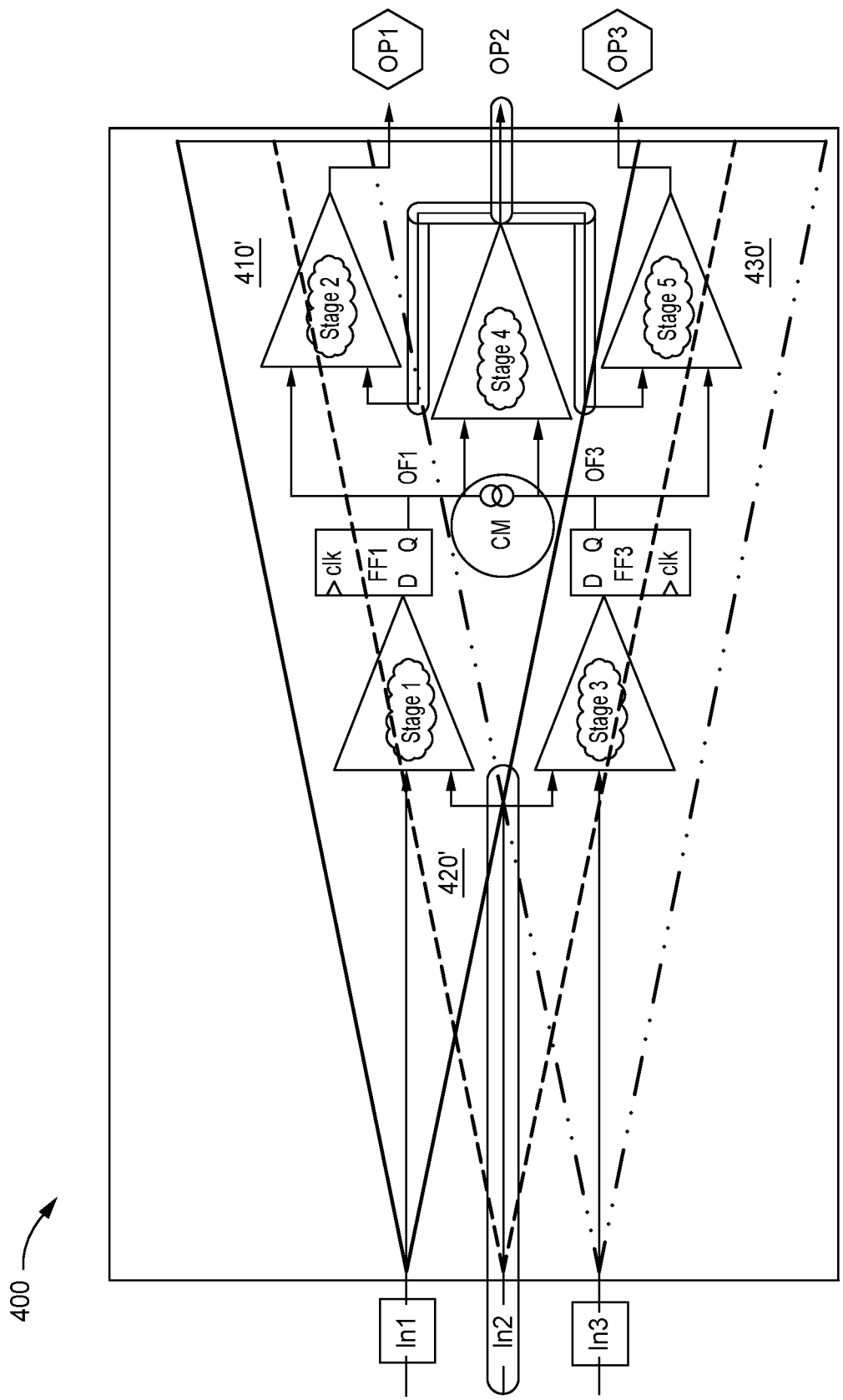
FIG. 10 illustrates example intersecting cones of influence and coupling factors for a circuit block, according to one or more examples.
Figure 11:
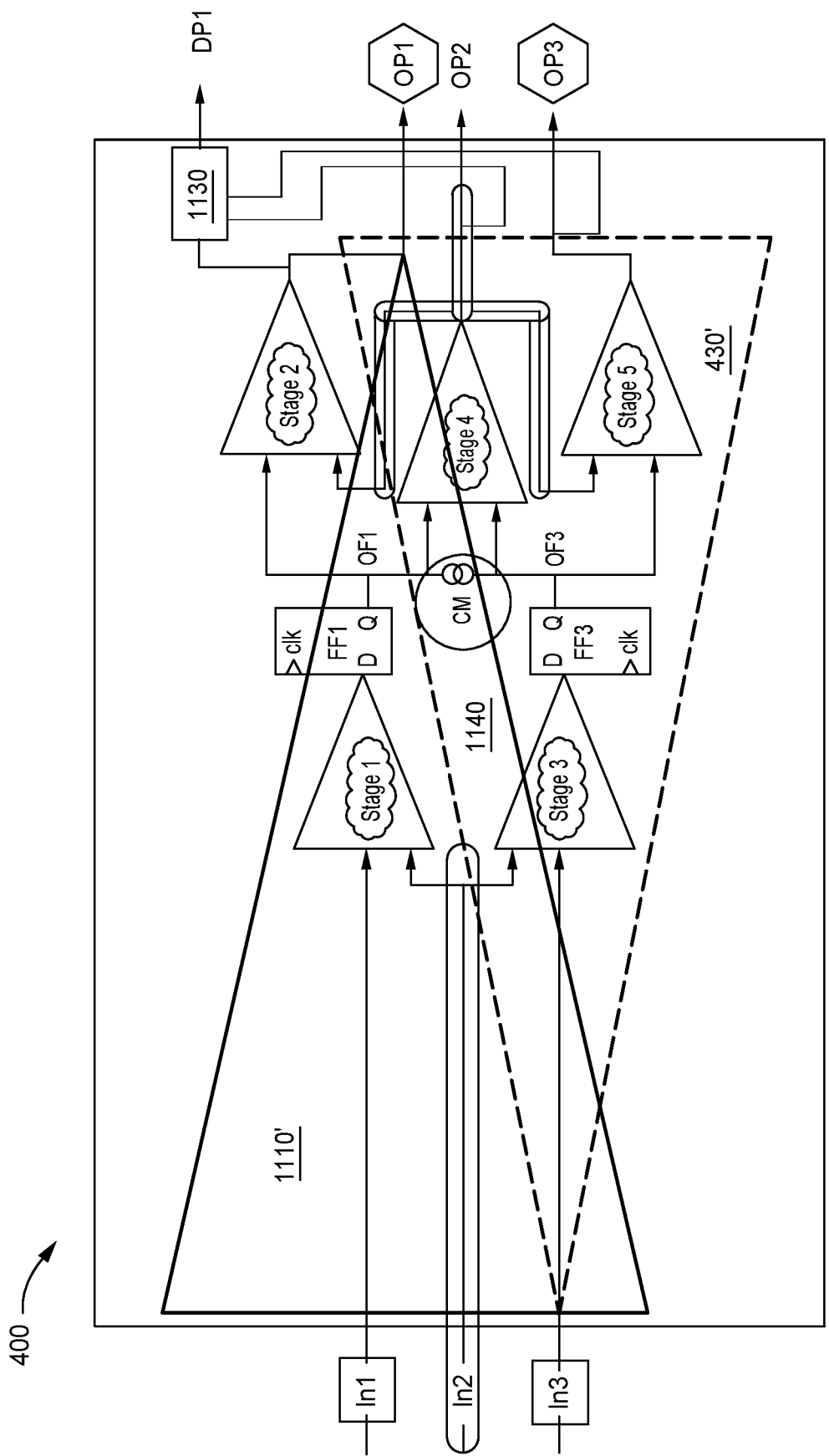
FIG. 11 illustrates example cones of influence and a safety circuitry for a circuit block, according to one or more examples.

With further reference to FIG. 5, at 512 of method 500, the coupling factors from intersecting cones of influence are determined. For example, with reference to FIG. 1, the evaluation engine 110 determines the coupling factors from the intersecting cones stored in the memory 130. FIG. 10 and FIG. 11 depict methods for determining coupling factors, such as a coupling mechanism CM. FIG. 10 illustrates the processed cones 410', 420', and 430' and a method for determining that a coupling mechanism performs as a coupling factor affecting two or more of the outputs OP1, OP2, and OP3. In the example of FIG. 10, the coupling mechanism CM is a coupling factor affecting both outputs OP1 and OP3. The coupling mechanism CM creates a potential signal path for dependent failures between the cones 410' and 430' respectively from the input In1 to output OP3 respectively from input In3 to output OP1. Accordingly, the coupling mechanism CM is identified as a coupling factor between the cones 410' and 420'. The coupling mechanism may be a coupling capacitor (e.g., a parasitic coupling between two signals). In other examples, the coupling mechanism may be an electromagnetic coupling, inductive coupling, and thermal coupling, among others. In one example, the coupling mechanism CM is not a physical coupling element. In such an example, the coupling mechanism CM is an induced coupling mechanism that creates a potential unintended signal path. The input In2 of cone 420' and the output OP2 may be excluded from the analysis, as the coupling effects associated with the In2 and the output OP2 have been mitigated. The evaluation engine 110 processes the cones 410' and 430' to determine that the coupling mechanism CM has a significant contribution on propagating failures (e.g., faults or disturbances) from the input In1 to the output OP3 and from the input In3 to the output OP1. Accordingly, the coupling mechanism CM is stored in the memory 130 as being a coupling factor and used to mitigate the potential for propagating the dependent failures.

FIG. 11 illustrates alternative method for determining that a coupling mechanism is a coupling factor for multiple outputs, according to certain embodiments. The evaluation engine 110 determines that the coupling mechanism CM performs as a coupling factor affecting both outputs OP1 and OP3 based on the intersecting cones 1110' and 430'. The cone 1110' is a reverse cone of influence for the signal path that includes OP1, which has the apex originating in OP1 and traversing the circuits tracing the signal path back to the inputs In1 and In3. In the method of FIG. 11, the cone 420' is omitted. The intersection area 1140 is the intersection area between the cones 1110' and 430'. The evaluation engine 110 processes the intersecting cones 1110' and 430' to confirm that the coupling mechanism contributes to the propagation of failures (e.g., faults or disturbances) from input In1 to output OP3 and from the input In3 to the output OP1 as all other identified signal paths are shared resources and omitted from processes through the above described mitigation techniques. Accordingly, the identified coupling mechanism CM may be used to mitigate the propagation of dependent failures. In one or more examples, the identified coupling factors are stored within the memory 130.

Returning to FIG. 5, at 514 of the method 500, areas of the cones of influence are evaluated and the contribution of each area on the overall DFA for the circuit design is determined. In one example, the evaluation engine 110 determines an area of each cone and determines the contribution of each cone to the overall DFA based on the area of each cone. The evaluation engine 110 determines the areas of each cone and contribution of each cone as described above. Further, with reference to FIG. 10, the severity (weightage) value with respect to output OP2, corresponding to cone 410' is determined based on the area of block stage 1, the area of flip-flop FF1, and the area of block stage 4 with regard to the total area of the corresponding circuit block. For example, the severity (weightage) value of the dependent failures corresponding to cone 410' is determined based on the evaluation of [Area(Stage1)+Area(FF1)+Area(Stage4)]/Area_Total.

The severity (weightage) value, with respect to output OP2, corresponding to cone 420' is determined based on the area on the circuit block stage 1, the area of the flip-flop FF1, the area of the circuit block stage 3, the area of the flip-flop FF3 and the area of the circuit block stage 4 with reference to the total area of the circuit block. For example, the severity (weightage) value of the dependent failures corresponding to the cone 420' is determined based on the evaluation of [Area(Stage1)+Area(FF1)+Area(Stage3)+Area(FF3)+Area(Stage4)]/Area_Total.

The severity (weightage) value of the dependent failures, with respect to OP2, corresponding to the cone 430' is determined based on the area of the block stage 3, the area of the flip-flop FF3, the area of the block stage 4 with reference to the area of the circuit block.

In one example, the area of the circuit block is the combined area of the circuit elements within the circuit block. For example, the combined area of the circuit block including the cones is determined based on Area_Total=$\Sigma_{i=1}^{5}$ Stagei+Area(FF1)+Area(FF3).

The areas of the cones along with the severity (weightage) value of each cone 410', 420' and 430' are stored within the memory 130 by the evaluation engine.

With further reference to FIG. 5, at 516 of the method 500, areas of intersections between the cones of influence are evaluated to determine the contribution of each intersection on the safety analysis of the circuit design. For example, the analysis engine 120 obtains the severity (weightage) value of each of the cones 410', 420', and 430', the areas of each of the cones 410', 420', and 430', and the cones 410', 420', and 430' from the memory 130.

As is noted above, the safety circuitry 1130 detects failures (e.g., faults) within the circuit block. The analysis engine 120 uses the severity (weightage) value of each of the cones 410', 420', and 430', the areas of each of the cones 410', 420', and 430', and the cones 410', 420', and 430' to determine the functionality of the safety circuitry 1130 based on a fault within the circuit block. In other examples, the circuit block of FIG. 11 may include additionally other safety circuitries. A safety circuitry may be referred to as a safety mechanism. Further, a safety circuitry is a technical solution implemented to detect and mitigate or tolerate faults, or to control or avoid failures, according to ISO26262-2018.

Further, the analysis engine 120 evaluates a combination of Boolean operations between the cones of influence and the contribution of the Boolean operations to the results on the safety analysis. The analysis engine 120 uses the severity (weightage) values to commensurate the affect from each SDF on the diagnostic coverage on the circuit block. The safety circuitry 1130 monitors the logic in a cone of 1110' that at originates from OP1 and encompasses the inputs In1 and In3. The safety circuitry 1130 may further monitor the logic of cone 430' (and 420') not illustrated.

The diagnostic coverage of the safety circuitry is represented by $K_{DC}$. In one example, the input In3 is an SDF with a fault propagation path along the cone 430' that propagates from the input In3 to the primary outputs OP1, OP2, and OP3. The cone 430' intersects with the cone 1110' at intersection area 1140. The intersection area 1140 of the cone 430' may impact the diagnostic coverage of safety circuitry SM1. For example, failures within the intersection area 1140 may impact the functional ability of the safety circuitry 1130.

In one example, the intersection area 1140 includes M % of the cone 1110'. M is in a range of about 0 percent to about 100 percent. Accordingly, the impacted diagnostic coverage of the safety circuitry 1130 is $K_{DC}*(1-M/100)$. Further, the new diagnostic coverage of the safety circuitry 1130 is represented as $K_{DC}*(1-P(\text{area of cone } 410'|\text{area of cone } 430'))$. Accordingly, the diagnostic coverage of the safety circuitry 1130 depends on the probability of failure yielded by the intersection between the area of the cone 410' and the area of the cone 430'. A similar method may be applied to other overlapping cones. For example, the analysis engine 120 determines the impact on the diagnostic coverage for SDFs of other overlapping cones. For example, the impact that SDF's of other overlapping cones on one or more safety circuitries may be determined. In one or more examples, the impact of severity (weightage) values may be used to mitigate dependent failures by a user specification, cone carving by the present system, evaluating the area and generating reports by the present system.

In one example, a circuit block includes a safety circuitry that is configured to detect failures for an entire circuit block including multiple SDFs (e.g., inputs). In such examples, the safety circuitry may be negatively affected by a failure. For example, functionality of the safety circuitry may be reduced based on a failure. The failure may be a change of a voltage level of a power supply signal that alters a functionality of the safety circuitry. In one example, if the voltage level of the power supply signal drops below an operating threshold for the safety circuitry, the safety circuitry is unable to detect failures within the circuit block.

In one example, a safety circuitry of a circuit block determines whether or not a failure occurred within the circuit based on the severity (weightage) values as determined above. For example, with reference to FIG. 11, the safety circuitry 1130 receives a signal from each signal path (e.g., the signal path of the output OP1, the output OP2, and the output OP3), and multiples the received signal with the corresponding severity (weightage) values of each SDF (e.g., the input In1, the input In2, and the input In3) to determine whether or not a failure occurred within the corresponding circuitry.

In one example, the shared resources, the coupling mechanism, the cones, and/or the severity (weightage) values are output to a display (e.g., the video display unit 1410 of FIG. 14) or another processing system (e.g., a system integrator). The shared resources, the coupling mechanism, the cones, and/or the severity (weightage) values are used to alter the design of the circuit block and/or system to reduce the effects of the dependent failures. For example, a circuit design may be altered to provide an alternative power supply signal to the safety circuitry to ensure that the safety circuitry remains functional when a failure within the circuit block occurs. In one or more examples, a circuit design may be altered to adjust one or more signal paths to reduce the ability for dependent failures to propagate to multiple outputs. In other examples, the identification of the shared resources, the coupling mechanism, the cones, and/or the severity (weightage) values may be used to determine failures of reset signals (e.g., clock resets or common resets) within the circuit design.

In one more example, dependent failures that occur between a mission circuit and the associated safety circuitry are mitigated. The mission circuit is a circuit monitored by the safety circuitry. The safety circuitry detects or controls failures of the mission function. In one example, dependent failures may negatively affect the mission circuit and the safety circuitry, accordingly, the safety circuitry may not detect failures in the mission circuit. For example, the functionality of the safety circuitry may be negatively impacted by a dependent failure such that the safety circuitry is unable to detect failures within the mission circuit. In one example, a circuit design may be adjusted to mitigate the dependent failures such that the safety circuitry is able to protect (e.g., prevent failures from propagating to) the mission circuit.

In one specific example, a voltage regulator is monitored by a voltage monitor. In such an example, the voltage regulator is the mission circuit and the voltage monitor is the safety circuitry. The voltage monitor determines whether or not the voltage regulator is functioning properly. For example, safety circuitry determines whether or not the output voltage provided by the voltage regulator meets operating parameters, e.g., staying within a range of voltage values. In one example, the voltage regulator and the voltage monitor are supplied via a common power supply signal. If the voltage level of the power supply signal drops below an operating voltage of the voltage monitor, the voltage monitor may not continue to monitor the voltage regulator. Accordingly, the voltage monitor may be not be able to detect failures within the voltage regulator.

In one example, to mitigate the effects of dependent failures, the circuit design may be adjusted. For example, the circuit design may be adjusted to include additional signal lines, power sources, and/or safety circuitries, among others, to mitigate the effects of the dependent failures. In one example, a circuit design may be adjusted to add a safety circuitry after a shared resource to detect failure within the shared resources.

Further, the severity (weightage) value of each cone may be used to determine an effect that a dependent failure has on a safety circuitry. If the severity (weightage) value is greater than a threshold, the circuit design may be adjusted to mitigate the effects of a dependent failure. In other examples, if the severity (weightage) value is less than a threshold, the dependent failure may be ignored, and circuit design may not be adjusted to account for the dependent failure.

Figure 12:
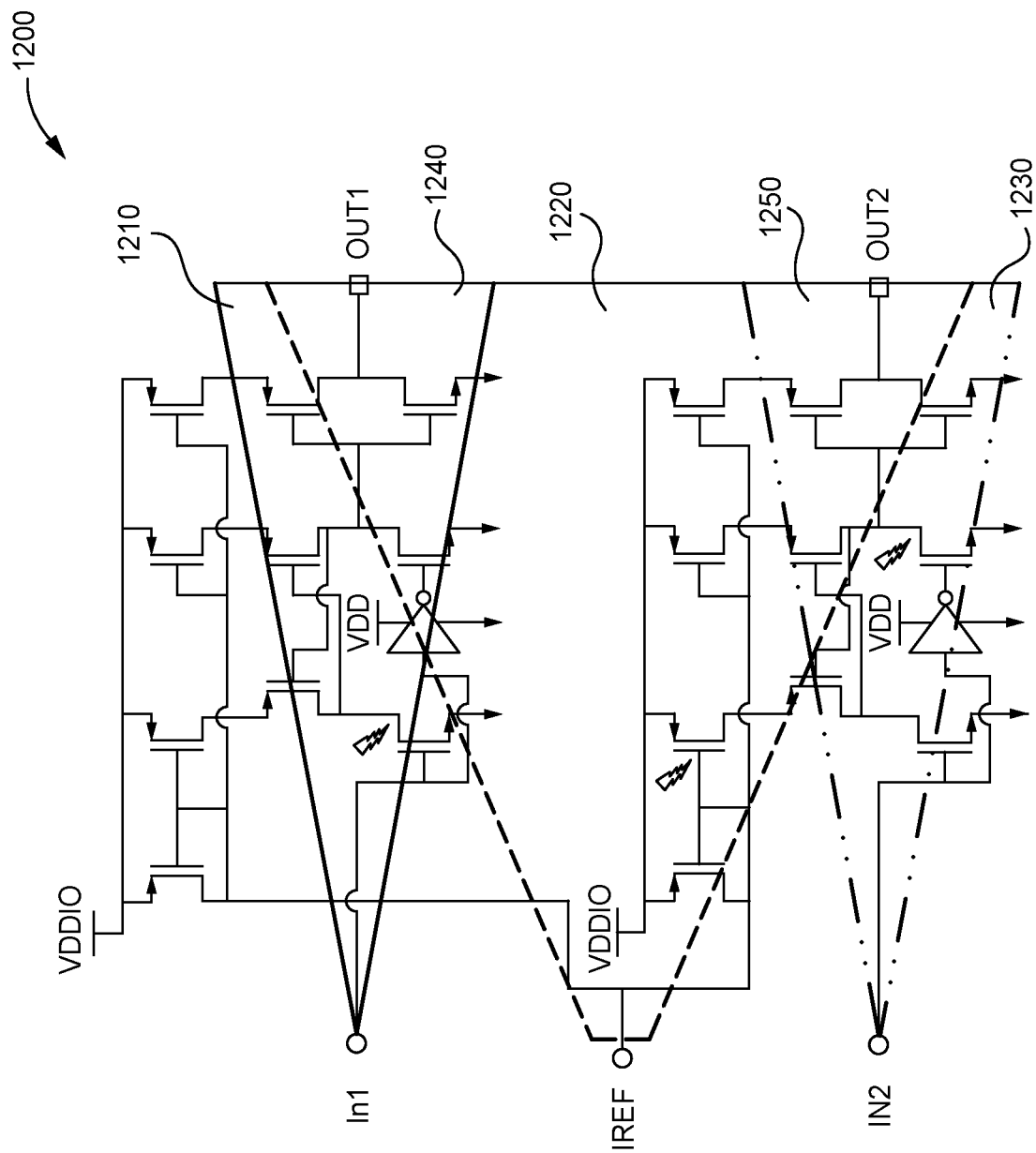
FIG. 12 illustrates example cones of influence for a circuit block, according to one or more examples.

In one or more examples, the method 500 may be applied to analog and mixed-signal circuits as well as logic circuits. FIG. 12, the method 500 illustrates circuit 1200. The circuit 1200 is a level shifter circuit. The method 500 may be implemented to determine the cones 1210, 1220, and 1230 from the inputs IN1, IREF, and IN2, respectively. The evaluation engine 110 detects the cones 1210, 1220, and 1230 to determine the shared resources and other coupling factors in overlapping cone portions 1240 and 1250. The analysis engine 120 determines the cones 1210, 1220, and 1230 by following the signal path from the inputs IN1 and IN2 to the output OUT1 and OUT2 respectively. The input IREF is a reference current input used to control the current consumption during the switching of the order of the circuit 1200 to avoid high cross-currents and maintain low-power consumption. The set of dependent failures DFA1 corresponds to the area of the cone 1210. The DFA1 includes 8 transistors that are subject to cascading failures. The set of dependent failures DFA2 corresponds to the area of the cone 1230. The DFA2 includes 4 transistors that are subject to cascading failures. The set of dependent failures DFA3 corresponds to the area of the cone 1220. The DFA3 includes 14 transistors that are subject to common cause failures. The DFA1-DFA3 represents a total area of 24 transistors. A cascading failure may be defined as failure of an element resulting from a root cause, e.g., inside or outside of the element, and then causing a failure of another element or elements of the same or different item.

The analysis engine 120 determines a severity (weightage) value of the dependent failures corresponding to the cones of influence 1210, 1220, and 1230. The severity (weightage) value of the dependent failures is the number of transistors in each cone of influence divided by the total number of transistors. For example, the severity (weightage) value of the cone 1210 is 8/24, or 33.33 percent. The severity (weightage) value of the cone 1230 is 4/24, or 16.66 percent. The severity (weightage) value of the cone 1220 is 14/24, or 58.33 percent. The severity (weightage) values are allocated for both cascading failures and common cause failures. Common cause failures related to the input IREF (cone 1220) have a higher severity (weight) value than cascading failures on each of inputs IN1 and IN2 (cones 1210 and 1230, respectively) due to the shared resources acting as a source of dependent failures.

Figure 13:
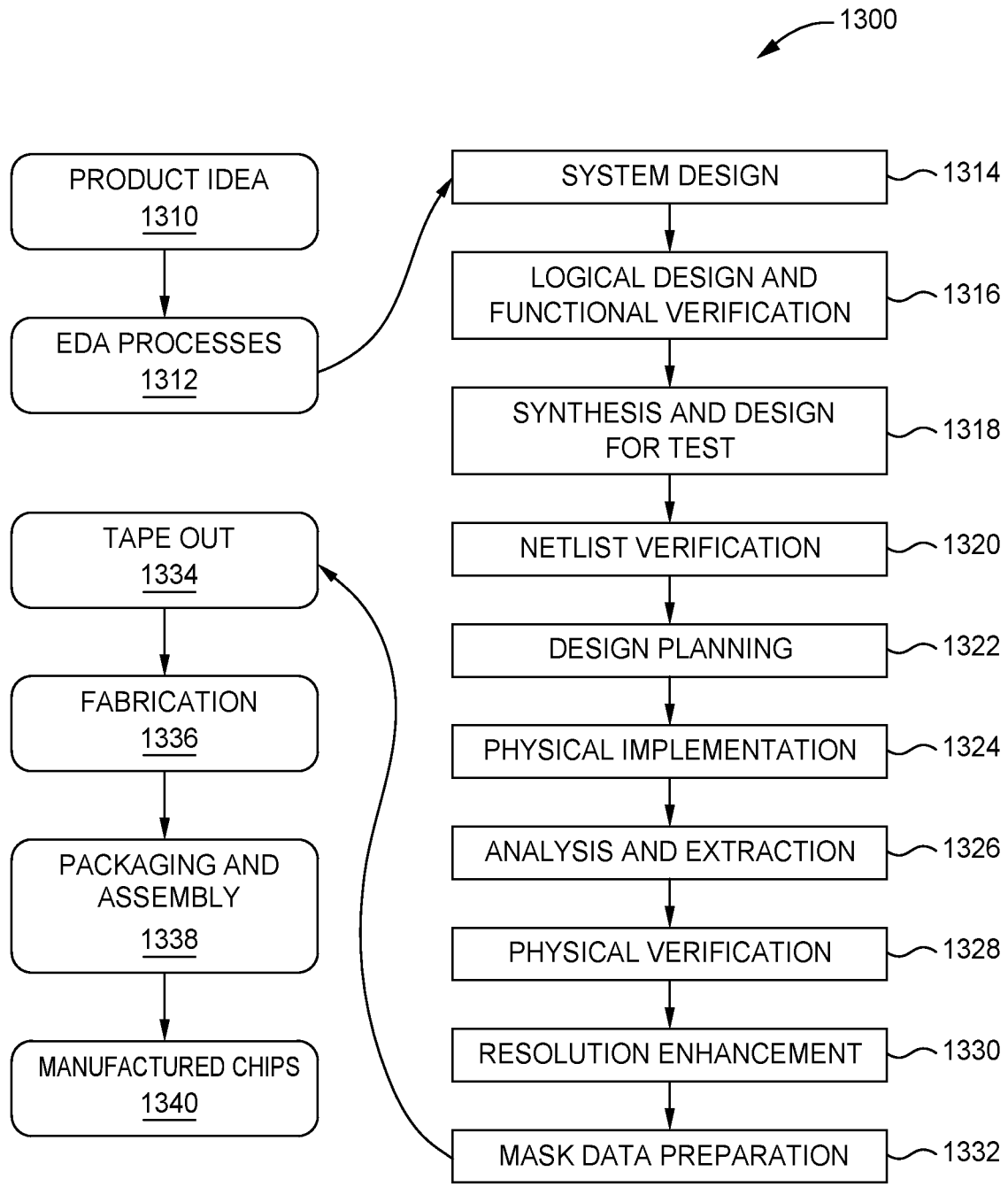
FIG. 13 depicts a flowchart of various processes used during the design and manufacture of an integrated circuit in accordance with some embodiments of the present disclosure.

FIG. 13 illustrates an example set of processes 1300 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1310 with information supplied by a designer, information which is transformed to create an article of manufacture that uses a set of EDA processes 1312. When the design is finalized, the design is taped-out 1334, which is when artwork (e.g., geometric patterns) for the integrated circuit is sent to a fabrication facility to manufacture the mask set, which is then used to manufacture the integrated circuit. After tape-out, a semiconductor die is fabricated 1336 and packaging and assembly processes 1338 are performed to produce the finished integrated circuit 1340.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 1314, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1316, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1318, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1320, the netlist is checked for compliance with timing constraints and for correspondence with the HDL code. During design planning 1322, an overall floor plan for the integrated circuit is constructed and analyzed for timing and top-level routing.

During layout or physical implementation 1324, physical placement (positioning of circuit components such as transistors or capacitors) and routing (connection of the circuit components by multiple conductors) occurs, and the selection of cells from a library to enable specific logic functions can be performed. As used herein, the term 'cell' may specify, but is not limited to, a set of transistors, other components, and interconnections that provide a Boolean logic function (e.g., AND, OR, NOT, XOR), a storage function (such as a flipflop or latch), an analog function (such as a gain function), a mixed-signal function (such as analog-to-digital or digital-to-analog conversion) or a signal processing function (such as time integration or time derivation of signals). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1326, the circuit function is verified at the layout level, which permits refinement of the layout design. During physical verification 1328, the layout design is checked to ensure that manufacturing constraints are correct, such as DRC constraints, electrical constraints, lithographic constraints, and that circuitry function matches the HDL design specification. During resolution enhancement 1330, the geometry of the layout is transformed to improve how the circuit design is manufactured.

During tape-out, data is created to be used (after lithographic enhancements are applied if appropriate) for production of lithography masks. During mask data preparation 1332, the 'tape-out' data is used to produce lithography masks that are used to produce finished integrated circuits.

A storage subsystem of a computer system (such as computer system 1400 of FIG. 14) may be used to store the programs and data structures that are used by some or all of the EDA products described herein, and products used for development of cells for the library and for physical and logical design that use the library.

FIG. 14 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM), a static memory 1406 (e.g., flash memory, static random access memory (SRAM), etc.), and a data storage device 1418, which communicate with each other via a bus 1430.

Processing device 1402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 may be configured to execute instructions 1426 for performing the operations and steps described herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a non-transitory computer-readable medium) on which is stored one or more sets of instructions 1426 or software embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In some implementations, the instructions 1426 include instructions to implement functionality corresponding to the present disclosure. While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a circuit design comprising a plurality of circuit elements;
   generating, by a processor, a first cone of influence and a second cone of influence for the circuit design, the first cone of influence corresponds to a first one or more inputs of the circuit design and the second cone of influence corresponds to a second one or more inputs of the circuit design;
   determining a first shared circuit element of the circuit elements within a first intersection between the first cone of influence and the second cone of influence;
   determining a first coupling factor based on the first intersection between the first cone of influence and the second cone of influence; and
   outputting the first shared circuit element and the first coupling factor to a memory.

2. The method of claim 1 further comprising:
  determining sources of dependent failures within the first cone of influence and the second cone of influence, wherein the first one or more inputs and the second one or more inputs correspond to respective ones of the sources of dependent failures; and
  determining a probability of dependent failures based on the first intersection between the first cone of influence and the second cone of influence.

3. The method of claim 1, wherein generating the first cone of influence comprises tracing a signal path from the first one or more inputs to a first one or more outputs of the circuit design.

4. The method of claim 1, wherein the first coupling factor includes one or more sources of dependent failures associated with at least one of the first cone of influence and the second cone of influence, and a severity value of the source of dependent failures is determined based on a ratio of a cell area of its originating cone of influence to a cell area of the circuit design.

5. The method of claim 1 further comprising:
  generating a third cone of influence for the circuit design, the third cone of influence corresponds to a third one or more inputs of the circuit design; and
  determining a second shared circuit element within a second intersection between the first cone of influence and the third cone of influence.

6. The method of claim 1 further comprising:
  determining a first sub-cone of the first cone of influence and a second sub-cone of the first cone of influence;
  determining a second shared circuit element based on an intersection between the first sub-cone and the second sub-cone; and
  determining a second coupling factor based on the first sub-cone and the second sub-cone.

7. The method of claim 1, wherein the first coupling factor is one or more of the first shared circuit element and a coupling mechanism of the circuit design.

8. The method of claim 1, wherein the first cone of influence includes a first element and a second element, wherein the second element is coupled to the first one or more inputs via the first element, and the first element is a shared resource of the first cone of influence.

9. A system comprising:
  a memory storing instructions; and
  a processor, coupled with the memory to execute the instructions, the instructions when executed cause the processor to:
    obtain a circuit design comprising a plurality of circuit elements;
    generate a first cone of influence and a second cone of influence for the circuit design, the first cone of influence corresponds to a first one or more inputs of the circuit design and the second cone of influence corresponds to a second one or more inputs of the circuit design;
    determine a first shared circuit element of the circuit elements within a first intersection between the first cone of influence and the second cone of influence;
    determine a first coupling factor within the first intersection between the first cone of influence and the second cone of influence; and
    output the first shared circuit element and the first coupling factor to the memory.

10. The system of claim 9, wherein the instructions, when executed, further cause the processor to:
  determine sources of dependent failures within the first cone of influence and the second cone of influence, wherein the first one or more inputs and the second one or more inputs correspond to respective ones of the sources of dependent failures; and
  determine a probability of dependent failures based on the first intersection between the first cone of influence and the second cone of influence.

11. The system of claim 9, wherein generating the first cone of influence comprises tracing a signal path from first one or more inputs to a first or more outputs of the circuit design, and generating the second cone of influence comprises tracing a signal path from the second one or more inputs to a second one or more outputs of the circuit design.

12. The system of claim 9, wherein the first coupling factor includes one or more sources of dependent failures associated with at least one of the first cone of influence and the second cone of influence.

13. The system of claim 9, wherein the instructions, when executed, further cause the processor to:
  generate a third cone of influence for the circuit design, the third cone of influence corresponds to a third one or more inputs of the circuit design; and
  determine a second shared circuit element within a second intersection between the first cone of influence and the third cone of influence.

14. The system of claim 9, wherein the instructions, when executed, further cause the processor to:
  determine a first sub-cone of the first cone of influence and a second sub-cone of the first cone of influence;
  determine a second shared circuit element based on an intersection between the first sub-cone and the second sub-cone; and
  determine a second coupling factor based on the first sub-cone and the second sub-cone.

15. A non-transitory computer readable medium comprising stored instructions, which when executed by a processor, cause the processor to:
  generate a first cone of influence and a second cone of influence from a circuit design, the first cone of influence originating from a first one or more inputs of the circuit design and propagating to a first one or more outputs of the circuit design, and the second cone of influence originating from a second one or more inputs of the circuit design and propagating to a second one or more outputs of the circuit design;
  determine a first intersecting cone between the first cone of influence and the second cone of influence;
  determine a first shared circuit element of the circuit design based on the first intersecting cone; and
  output the first shared circuit element to the memory.

16. The non-transitory computer readable medium of claim 15, wherein the processor is further caused to determine a first coupling factor based on the first intersecting cone.

17. The non-transitory computer readable medium of claim 16, wherein the first coupling factor includes one or more sources of dependent failures associated with at least one of the first cone of influence and the second cone of influence.

18. The non-transitory computer readable medium of claim 15, wherein the processor is further caused to determine sources of dependent failures, the first one or more inputs and the second one or more inputs correspond to respective ones of the sources of dependent failures.

19. The non-transitory computer readable medium of claim 15, wherein generating the first cone of influence comprises tracing a signal path from the first one or more inputs to the first one or more outputs of the circuit design, and generating the second cone of influence comprises tracing a signal path from the second one or more inputs to the second one or more outputs of the circuit design.

20. The non-transitory computer readable medium of claim 15, wherein the processor is further caused to:
- generate a third cone of influence for the circuit design, the third cone of influence originating to a third one or more inputs of the circuit design and propagating to a third one or more outputs of the circuit design; and
- determine a second shared circuit element within a second intersection between the first cone of influence and the third cone of influence.

* * * * *